US012192612B2

(12) United States Patent
Zhu et al.

(10) Patent No.: US 12,192,612 B2
(45) Date of Patent: Jan. 7, 2025

(54) SHOOTING METHOD AND ELECTRONIC DEVICE

(71) Applicant: Honor Device Co., Ltd., Shenzhen (CN)

(72) Inventors: Shiyu Zhu, Shenzhen (CN); Yonghua Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/041,243

(22) PCT Filed: Aug. 26, 2022

(86) PCT No.: PCT/CN2022/115046
§ 371 (c)(1),
(2) Date: Feb. 10, 2023

(87) PCT Pub. No.: WO2023/093167
PCT Pub. Date: Jun. 1, 2023

(65) Prior Publication Data
US 2024/0305876 A1    Sep. 12, 2024

(30) Foreign Application Priority Data

Nov. 25, 2021  (CN) .......................... 202111415560.X
Dec. 1, 2021   (CN) .......................... 202111460030.7

(51) Int. Cl.
H04N 23/611   (2023.01)
G06F 3/01     (2006.01)
H04N 23/63    (2023.01)
H04N 23/90    (2023.01)

(52) U.S. Cl.
CPC .......... *H04N 23/611* (2023.01); *G06F 3/017* (2013.01); *H04N 23/632* (2023.01); *H04N 23/90* (2023.01)

(58) Field of Classification Search
CPC .... H04N 23/611; H04N 23/632; H04N 23/90; G06F 3/017
See application file for complete search history.

(56) References Cited

U.S. PATENT DOCUMENTS

| 11,423,701 B2 | 8/2022 | Guo et al. |
| 2005/0271252 A1 | 12/2005 | Yamada |
| 2009/0172606 A1* | 7/2009 | Dunn .................. G06F 3/04883 715/863 |
| 2011/0001813 A1 | 1/2011 | Kim et al. |

(Continued)

FOREIGN PATENT DOCUMENTS

| CN | 105469043 A | 4/2016 |
| CN | 106231175 A | 12/2016 |

(Continued)

*Primary Examiner* — Padma Haliyur
(74) *Attorney, Agent, or Firm* — Slater Matsil, LLP

(57) ABSTRACT

A shooting method is provided. By implementing the shooting method provided in embodiments of this application, a terminal electronic device such as a smartphone or a smart television can determine to change a shooting mode based on a recognized user gesture. The electronic device can recognize a user's waving or sliding gesture more accurately based on the user's hand position change track in an image frame sequence and whether there are hand movements in two directions in the position changes.

20 Claims, 24 Drawing Sheets

(56) References Cited

U.S. PATENT DOCUMENTS

| | | |
|---|---|---|
| 2012/0281129 A1 | 11/2012 | Wang et al. |
| 2013/0050425 A1* | 2/2013 | Im .................... G06F 3/0304 348/46 |
| 2014/0192245 A1 | 7/2014 | Lee et al. |
| 2019/0311190 A1* | 10/2019 | Wang .................. G06V 40/113 |
| 2021/0097775 A1* | 4/2021 | Zurmoehle ........... G06F 3/0346 |
| 2021/0158031 A1* | 5/2021 | Du ...................... G06N 3/045 |
| 2021/0334524 A1 | 10/2021 | Guo et al. |
| 2022/0137713 A1 | 5/2022 | Hu et al. |
| 2022/0269351 A1 | 8/2022 | Wu et al. |
| 2023/0188826 A1 | 6/2023 | Wu et al. |
| 2023/0394868 A1* | 12/2023 | Nakamura ........... G06V 40/145 |

FOREIGN PATENT DOCUMENTS

| | | |
|---|---|---|
| CN | 106648078 A | 5/2017 |
| CN | 110045819 A | 7/2019 |
| CN | 110837778 A | 2/2020 |
| CN | 111857356 A | 10/2020 |
| CN | 112394811 A | 2/2021 |
| CN | 112637515 A | 4/2021 |
| CN | 112818857 A | 5/2021 |
| CN | 112947755 A | 6/2021 |
| CN | 113536864 A | 10/2021 |
| EP | 4216563 A1 | 7/2023 |
| JP | 2012123608 A | 6/2012 |
| JP | 2015184841 A | 10/2015 |
| JP | 2020118024 A | 8/2020 |
| KR | 20140113314 A | 9/2014 |
| KR | 101500412 B1 | 3/2015 |
| KR | 20190135794 A | 12/2019 |
| WO | 2014111947 A1 | 7/2014 |
| WO | 2021169399 A1 | 9/2021 |
| WO | 2021219141 A1 | 11/2021 |

* cited by examiner

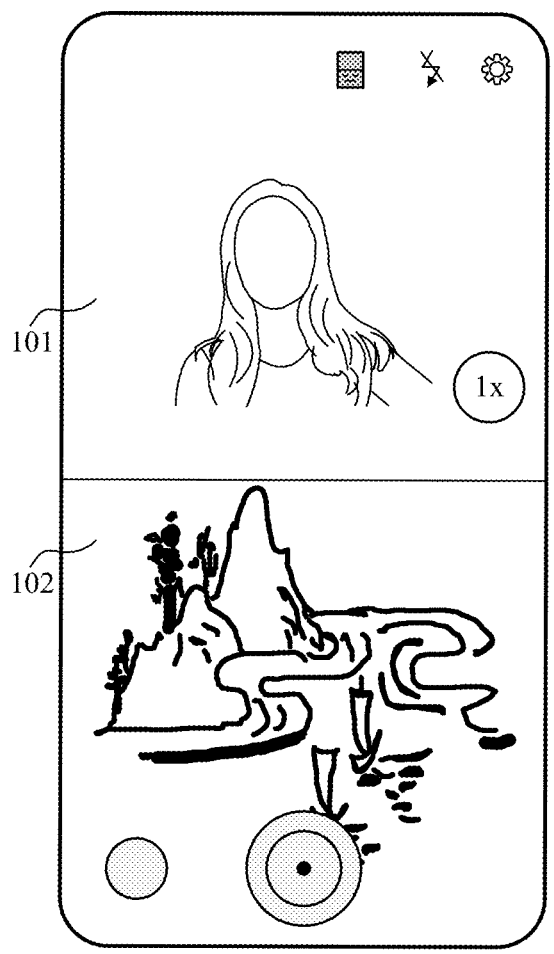
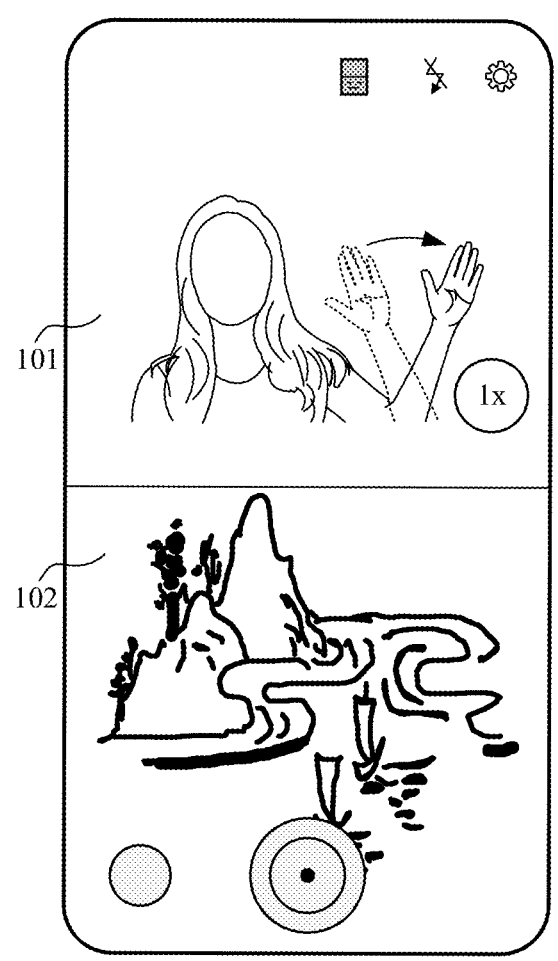
FIG. 3C                                FIG. 3D

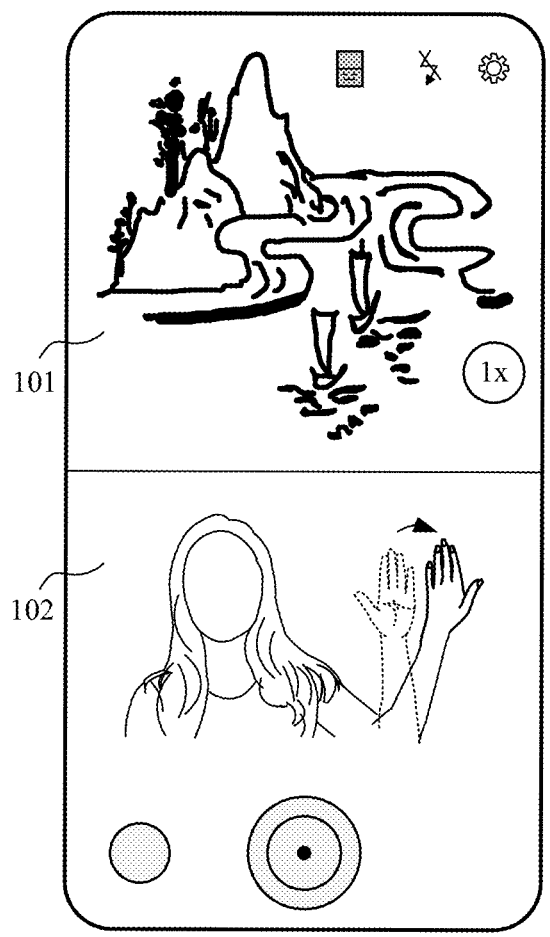
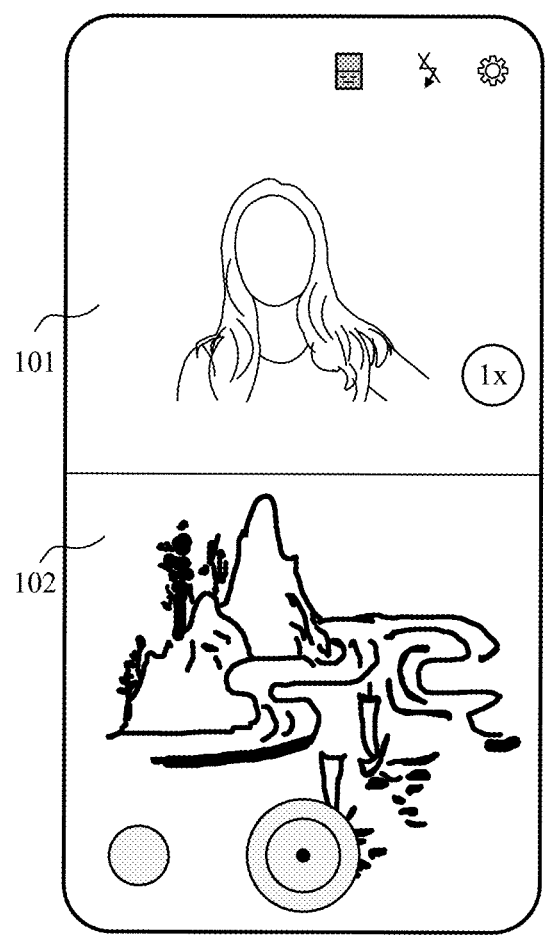
FIG. 4A
FIG. 4B

SHOOTING METHOD AND ELECTRONIC DEVICE

CROSS-REFERENCE TO RELATED APPLICATIONS

This application is a national stage of International Application No. PCT/CN2022/115046, filed on Aug. 26, 2022, which claims priority to Chinese Patent Application No. 202111415560.X, filed on Nov. 25, 2021, and Chinese Patent Application No. 202111460030.7, filed on Dec. 1, 2021. The disclosures of each of the aforementioned applications are hereby incorporated by reference in their entireties.

TECHNICAL FIELD

This application relates to the terminal field, and in particular, to a shooting method and an electronic device.

BACKGROUND

An electronic device such as a mobile phone provides a variety of shooting modes. A user can choose a shooting mode suitable for a current scenario in different scenarios to obtain better shooting experience. However, in an existing process of switching between shooting modes, the user needs to tap a control on a screen to complete the switching. The method of switching between shooting modes by the user by tapping the screen is inconvenient for the user.

SUMMARY

This application provides a shooting method. By implementing the method, an electronic device can more accurately recognize that a gesture performed by a user is a waving gesture or a sliding gesture.

According to a first aspect, an embodiment of this application provides a shooting method. The method may be applied to an electronic device. The electronic device includes a first camera and a second camera. The method includes: displaying a first interface, where the first interface includes a first preview window and a second preview window, the first preview window displays an image captured in real time by the first camera, and the second preview window displays an image captured in real time by the second camera; detecting a first gesture of a user; and displaying a second interface in response to the first gesture, where the second interface includes a third preview window, and the third preview window displays an image captured in real time by the first camera or the second camera, where the detecting a first gesture of a user includes: capturing a first image, where the first image is an image captured by the first camera or the second camera, the first image includes a hand image, and the hand image is located at a first position in the first image; capturing a second image, where the second image is an image captured by the first camera or the second camera, the second image includes the hand image, the hand image is located at a second position in the second image, and the second position is different from the first position; and determining the first gesture based on the first position and the second position.

By implementing the method provided by the first aspect, the electronic device can control switching between different shooting modes based on the recognized gesture of the user. The electronic device can determine, based on positions of the hand image in two frames of images, a moving track of the gesture performed by the user, and then recognize, based on the recognized moving track, the gesture performed by the user.

With reference to the embodiment provided in the first aspect, in some embodiments, the determining the first gesture based on the first position and the second position includes: determining a first displacement vector based on the first position, where the first displacement vector includes first direction information, and the first direction information is used to identify a direction of the first displacement vector; determining a second displacement vector based on the second position, where the second displacement vector includes second direction information, and the second direction information is used to identify a direction of the second displacement vector; and the based on the first position and the second position includes: determining the first gesture based on the first displacement vector and the second displacement vector.

By implementing the method provided in the foregoing embodiment, the electronic device can determine, based on the positions of the hand image in the captured two frames of images, vectors indicating moving directions of a hand in the two frames of images. By comparing whether the directions of the two vectors are the same, the electronic device can determine whether the gesture performed by the user is a preset gesture.

With reference to the embodiment provided in the first aspect, in some embodiments, the method further includes: capturing a third image, where the third image is an image captured after the first image is captured and before the second image is captured, the third image includes the hand image, the hand image is located at a third position in the third image, and the third position is different from both the first position and the second position; the determining a first displacement vector based on the first position includes: determining the first displacement vector based on the first position and the third position; and the determining a second displacement vector based on the second position includes: determining the second displacement vector based on the second position and the third position.

By implementing the method provided in the foregoing embodiment, the electronic device can further obtain an image between the first image and the second image, that is, the third image. By using the positions of the hand image in the third image and the first image, the electronic device can determine the first displacement vector; and by using the positions of the hand image in the third image and the second image, the electronic device can determine the second displacement vector. Further, the electronic device can determine, based on the directions of the first displacement vector and the second displacement vector, whether the gesture performed by the user is a preset gesture.

With reference to the embodiment provided in the first aspect, in some embodiments, the determining the first gesture based on the first displacement vector and the second displacement vector includes: when the first direction information is the same as the second direction information, determining that the first gesture is a sliding gesture.

By implementing the method provided in the foregoing embodiment, after obtaining the first displacement vector and the second displacement vector, the electronic device can determine, by using the first direction information and the second direction information included in the first displacement vector and the second displacement vector, whether the directions of the two displacement vectors are the same. When determining that the directions of the two displacement vectors are the same, the electronic device can confirm that the preset sliding gesture performed by the user is recognized.

With reference to the embodiment provided in the first aspect, in some embodiments, the method further includes: when the first direction information is different from the second direction information, determining that the first gesture is a waving gesture.

By implementing the method provided in the foregoing embodiment, the waving gesture may alternatively be used as a preset gesture for controlling switching of a shooting mode. If the first direction information is different from the second direction information, the electronic device can confirm that the preset waving gesture performed by the user is recognized.

With reference to the embodiment provided in the first aspect, in some embodiments, the first position is a corresponding position of the hand image on a first coordinate axis of the first image, where the first coordinate axis is parallel to the ground; the second position is a position of the characteristic point of the hand image on the first coordinate axis of the second image; the third position is a position of the characteristic point of the hand image on the first coordinate axis of the third image; the first direction information is a positive or negative direction of the first coordinate axis; and the second direction information is the positive or negative direction of the first coordinate axis.

By implementing the method provided in the foregoing embodiment, the electronic device can establish a horizontal coordinate axis in an image frame and use the horizontal coordinate axis to determine the position of the hand image in each image frame. Further, by using the position, the electronic device can determine the moving track of the hand image in an image frame sequence, that is, the moving track of the hand in a process of completing the gesture by the user.

With reference to the embodiment provided in the first aspect, in some embodiments, the positive direction of the first coordinate axis is a horizontal direction from left to right, and after the determining that the first gesture is a sliding gesture, the method further includes: when the first direction information is the positive direction of the first coordinate axis, determining that the first gesture is a right-sliding gesture in the sliding gesture; or when the first direction information is the negative direction of the first coordinate axis, determining that the first gesture is a left-sliding gesture in the sliding gesture.

By implementing the method provided in the foregoing embodiment, on a basis of recognizing the sliding gesture, the electronic device can further determine, based on the directions of the first displacement vector and the second displacement vector, that the gesture performed by the user is specifically the left-sliding gesture or the right-sliding gesture. In this way, left-sliding and right-sliding can be both preset as specific gestures for the user to control switching of the shooting mode.

With reference to the embodiment provided in the first aspect, in some embodiments, the determining the first displacement vector based on the first position and the third position includes: a position offset between the first position and the third position is a modulus of the first displacement vector, and a direction from the first position to the third position is the first direction information of the first displacement vector.

By implementing the method provided in the foregoing embodiment, the electronic device can determine, by using the positions of the hand image in the two adjacent frames of images, the first displacement vector representing the moving track of the hand image in the two frames of images.

With reference to the embodiment provided in the first aspect, in some embodiments, the determining the first displacement vector based on the first position and the third position includes: determining a fourth position by using the first position and the third position, where a position offset between the fourth position and the third position is a modulus of the first displacement vector, and a direction from the fourth position to the third position is the first direction information of the first displacement vector.

By implementing the method provided in the foregoing embodiment, the electronic device can use the position of the hand image in the frame of image to determine a smooth position of the hand image in each frame of image. The smooth position is virtual, and may defer motion displacements of the hand image in two frames of images. Then the electronic device determines the first displacement vector by using the smooth position and an actual position of the hand image in the image frame. In this way, when there is a movement in a slightly opposite direction in a frame of image in comparison with a previous frame of image, the electronic device does not perform misrecognition due to the movement in the slightly opposite direction.

With reference to the embodiment provided in the first aspect, in some embodiments, the determining a fourth position by using the first position and the third position includes: determining a fifth position corresponding to the first position, calculating a middle position between the fifth position and the third position, and determining that the middle position is the fourth position.

By implementing the method provided in the foregoing embodiment, the electronic device can determine a smooth position of the hand image in a subsequent frame of image based on a smooth position of the hand image in a previous image and an actual position of the hand image in the subsequent frame of image.

With reference to the embodiment provided in the first aspect, in some embodiments, before the detecting a first gesture of a user, the method further includes: detecting a first operation; and starting shooting in response to the first operation.

By implementing the method provided in the foregoing embodiment, the electronic device can recognize the gesture of the user in a process of shooting a video and switch the shooting mode at the same time, so that the shooting process after the switching can better meet a requirement of the user or a requirement of a current shooting scenario, thereby further improving user experience.

With reference to the embodiment provided in the first aspect, in some embodiments, the first operation includes: an operation performed on a first control, where the first control is displayed on the first interface; or an operation of recognizing a second gesture performed by the user, where the second gesture corresponds to the first control.

By implementing the method provided in the foregoing embodiment, the electronic device can start shooting by using the control on the user interface or can start shooting by recognizing the specific gesture that controls shooting.

With reference to the embodiment provided in the first aspect, in some embodiments, the first camera is a front camera, and the second camera is a back camera; or the first camera is a front camera, and the second camera is a front camera; or the first camera is a back camera, and the second camera is a back camera.

By implementing the method provided in the foregoing embodiment, the cameras used by the electronic device to implement dual-view shooting or multi-view shooting may be a front camera and a back camera, or may be both front cameras or may be both back cameras.

According to a second aspect, this application provides an electronic device. The electronic device includes one or more processors and one or more memories, where the one or more memories are coupled to the one or more processors, the one or more memories are configured to store computer program code, the computer program code includes computer instructions, and when the one or more processors execute the computer instructions, the electronic device is enabled to perform the method according to any one of the first aspect and possible implementations of the first aspect.

According to a third aspect, this application provides a computer-readable storage medium including instructions. When an electronic device runs the instructions, the electronic device is enabled to perform the method according to any one of the first aspect and possible implementations of the first aspect.

According to a fourth aspect, this application provides a computer program product including instructions. When an electronic device runs the computer program product, the electronic device is enabled to perform the method according to any one of the first aspect and possible implementations of the first aspect.

It may be understood that the electronic device provided in the second aspect, the computer storage medium provided in the third aspect, and the computer program product provided in the fourth aspect are all configured to perform the method provided in the first aspect of this application. Therefore, for the beneficial effects that can be achieved, refer to the beneficial effects corresponding to the foregoing method. Details are not described herein again.

BRIEF DESCRIPTION OF THE DRAWINGS

FIG. 3A to FIG. 3F are a group of user interfaces for switching a dual-view shooting mode by recognizing a right-sliding gesture according to an embodiment of this application;

FIG. 4A to FIG. 4D are a group of user interfaces for switching a dual-view shooting mode by recognizing a flipping gesture according to an embodiment of this application;

DETAILED DESCRIPTION OF ILLUSTRATIVE EMBODIMENTS

Figure 1A:
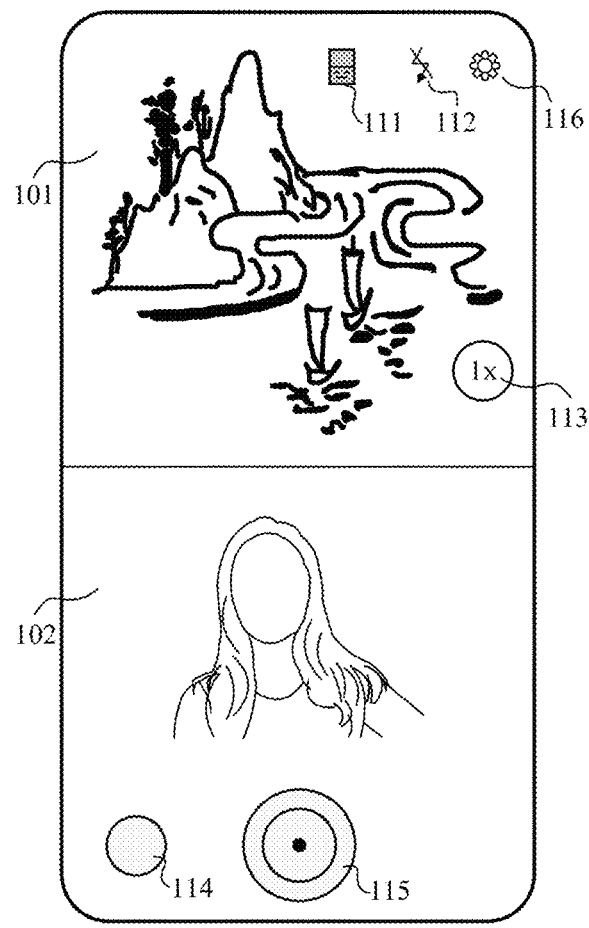
FIG. 1A and FIG. 1B are a group of user interfaces for setting a dual-view shooting mode according to an embodiment of this application.

Terms used in the following embodiments of this application are merely intended to describe specific embodiments, but are not intended to limit this application.

An electronic device such as a mobile phone provides a variety of shooting modes. A user can choose a shooting mode suitable for a current scenario in different scenarios to obtain better shooting experience. However, in an existing process of switching between shooting modes, the user needs to tap a control on a screen to complete the switching. The method of switching between shooting modes by the user by tapping the screen is inconvenient for the user.

To facilitate switching between shooting modes when a user shoots a video, an embodiment of this application provides a shooting method. By implementing the shooting method provided in this embodiment of this application, when displaying a preview image or shooting a video, a terminal electronic device (an electronic device 100) such as a smartphone or a smart television can recognize a specific gesture performed by a user. After confirming that the specific gesture is recognized, the electronic device 100 can switch a shooting mode based on a type of the recognized gesture. The method in this application is applicable not only to a preview stage of video or picture shooting, but also to a shooting stage of a video shooting process after video shooting starts.

In this embodiment of this application, the shooting mode refers to different combinations and display types when the electronic device 100 turns on a plurality of cameras to perform multi-view shooting, including a mode of shooting by using a plurality of back cameras, a mode of shooting by using both a front camera and a back camera, a mode of shooting by using a plurality of front cameras, or the like.

The specific gesture includes a sliding gesture. The sliding gesture includes a left-sliding gesture and a right-sliding gesture. A moving track of the sliding gesture (the left-sliding gesture and the right-sliding gesture) is similar to that of a waving gesture. Therefore, the electronic device is likely to recognize the sliding gesture as the waving gesture, causing a recognition error. Herein, the waving gesture is a gesture of opening a palm and swinging left and right reciprocally, for example, an action of waving left and right when the user meets a person and greets or says goodbye. Sliding includes left-sliding and right-sliding. Using the left-sliding as an example, the left-sliding gesture is an action of opening the palm and sliding left.

By implementing the shooting method provided in this embodiment of this application, the electronic device 100 can recognize the user's waving or sliding gesture more accurately based on the user's hand position change track in an image frame sequence. In this way, a misrecognition rate of the waving and sliding gestures that are very similar is reduced, and user experience is improved.

Without being limited to the mobile phone or the smart television, the electronic device 100 may be a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, an in-vehicle device, a smart home device, and/or a smart city device. A specific type of the electronic device is not particularly limited in this embodiment of this application.

FIG. 1A and FIG. 1B, FIG. 2A to FIG. 2I, FIG. 3A to FIG. 3F, FIG. 4A to FIG. 4D, and FIG. 5A and FIG. 5B illustrate a group of user interfaces for an electronic device 100 to implement a shooting method provided in an embodiment of this application. Scenarios in which the electronic device 100 implements the shooting method provided in this embodiment of this application are hereinafter described in detail with reference to the foregoing user interfaces.

First, FIG. 1A illustrates a user interface for performing dual-view shooting by running a camera application on the electronic device 100. The camera application is an application program that invokes a camera of the electronic device 100 to provide a photographing or video service for a user. Dual-view shooting means that a plurality of cameras of the electronic device 100 are invoked simultaneously and that images captured by the plurality of cameras are displayed on a preview interface, so that the user can shoot a video including a plurality of views simultaneously.

As shown in FIG. 1A, the user interface may include a preview window 101 and a preview window 102. The preview window 101 or the preview window 102 may be used to display an image captured by a front camera or a back camera of the electronic device 100. The preview window may be used to display in real time an image captured by a camera of the electronic device 100. When detecting a shooting operation (such as photographing), the electronic device 100 may save an image displayed in the preview window as a picture; or when detecting a shooting operation (such as video shooting), the electronic device 100 may display, in the preview window 101 and/or the preview window 102, a video that is being shot, and save the video after shooting is stopped. The preview window 101 and/or the preview window 102 display/displays not only an image captured by a camera during previewing, but also a preview picture (that is, an image captured by a camera) when a video is shot (the same applies to other preview windows). The preview window in the method in this application may be a preview window at a preview stage when a video or picture is shot, or may be a preview window in a video shooting process after video shooting starts (it may be understood that a control 115 in FIG. 1A is tapped to start shooting, and the preview window 101 and the preview window 102 display preview pictures in the video shooting process, and the control 115 is tapped again to end shooting).

By default, after entering a dual-view shooting mode, the electronic device 100 can perform a "front/back" mode in dual-view shooting. The "front/back" mode is a shooting mode in which a front camera and a back camera of the electronic device 100 are invoked simultaneously to perform dual-view shooting, and images captured by the two cameras are displayed equally. As shown in FIG. 1A, in this case, the preview window 101 displays an image captured by the back camera, and the preview window 102 displays a picture captured by the front camera; or the preview window 101 may display an image captured by the front camera, and the preview window 102 may display a picture captured by the back camera.

The user interface shown in FIG. 1A further includes a control 111. The control 111 may be configured to switch the dual-view shooting mode. In addition to the "front/back" mode described above, the shooting modes further include a "back/back" mode, a "front/front" mode, a "picture-in-picture" mode, a "back" mode, a "front" mode, and the like.

The "back/back" mode is a shooting mode in which two different back cameras of the electronic device 100 are invoked simultaneously to perform dual-view shooting, and images captured by the two cameras are displayed equally. The two different back cameras may be, for example, an ordinary back camera and a wide-angle back camera. The "picture-in-picture" mode is a shooting mode in which a front camera and a back camera of the electronic device 100 are invoked simultaneously to perform dual-view shooting, and an image captured by the front camera is embedded in a form of a window into an image captured by the back camera, for example, "picture-in-picture" shown in a window 117 in FIG. 1B, where scenery captured by the back camera is mainly displayed on a screen; and a portrait captured by the front camera is embedded in a form of a small floating window on the upper left of the image captured by the back camera. The "back" mode is a shooting mode in which a front camera and a back camera of the electronic device 100 are invoked to perform dual-view shooting, but only an image captured by the back camera is displayed. The "front" mode is a shooting mode in which a front camera and a back camera of the electronic device 100 are invoked to perform dual-view shooting, but only an image captured by the front camera is displayed. It may be understood that the "back" mode may also be a shooting mode in which a back camera is invoked to perform shooting. Similarly, the "front" mode may also be a shooting mode in which a front camera is invoked to perform shooting. Switching from the "back" mode to the "front" mode is a switching operation for switching from a back camera to a front camera; and correspondingly, switching from the "front" mode to the "back" mode is a switching operation for switching from a front camera to a back camera.

In addition, the user interface may further include a control 112, a control 113, a control 114, the control 115, and a control 116. The control 112 may be configured to control turn-on/off of a flashlight of the electronic device 100. The control 113 may be configured to adjust a focal length of a front camera. The control 114 may be configured to display a shot photo or video. The control 115 may be configured to control starting/ending of dual-view shooting. The control 116 may be configured to provide more functions for setting shooting parameters for the user. Details are not described herein.

The electronic device 100 can detect a user operation performed on the control 111, where the user operation is, for example, a tapping operation. In response to the foregoing operation, the electronic device 100 can display the user interface shown in FIG. 1B. The user interface displays the window 117. The window 117 displays the shooting modes such as "front/back" and "back/back". In this case, the electronic device 100 can detect a user operation performed on any shooting mode, and set a currently used dual-view shooting mode as a shooting mode selected by the user.

Figure 1B:
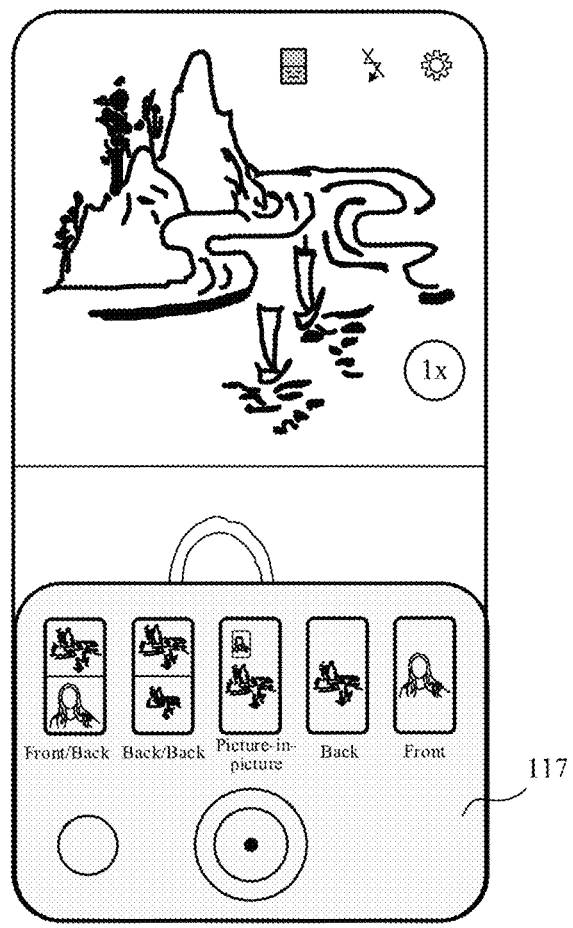

On the user interfaces shown in FIG. 1A and FIG. 1B, a process of switching the dual-view shooting mode requires an operation of tapping the screen by the user. In most dual-view shooting scenarios, the method of switching between shooting modes by the user by tapping the screen is inconvenient for the user. To avoid the foregoing problem, in this embodiment of this application, the electronic device 100 can switch between different dual-view shooting modes by recognizing a gesture of the user.

For example, in the shooting scenario shown in FIG. 1A, the user can extend a palm to slide left to control the electronic device 100 to close the preview window 101, thereby switching from the "front/back" mode shown in FIG. 1A to the "front" or "back" shooting mode.

Figure 2A:
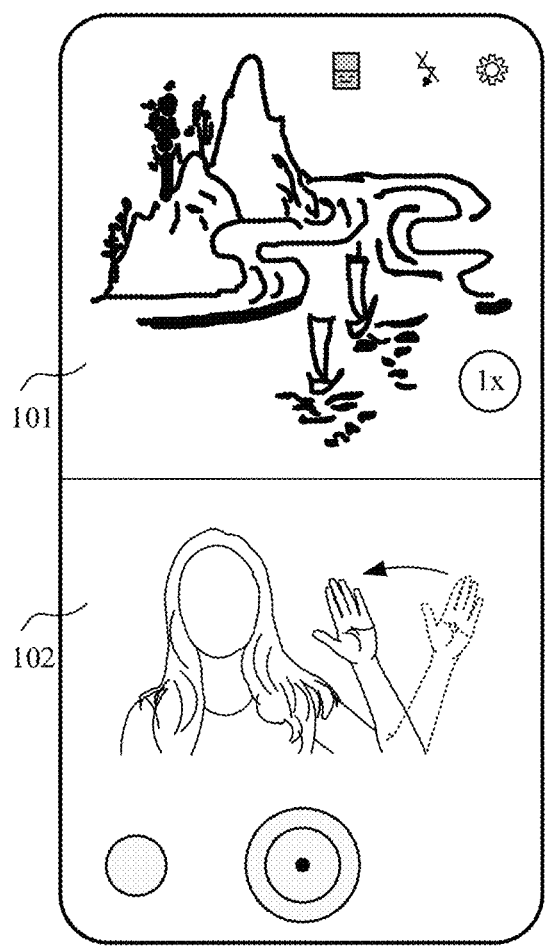
FIG. 2A to FIG. 2I are a group of user interfaces for switching a dual-view shooting mode by recognizing a left-sliding gesture according to an embodiment of this application.
Figure 2B:
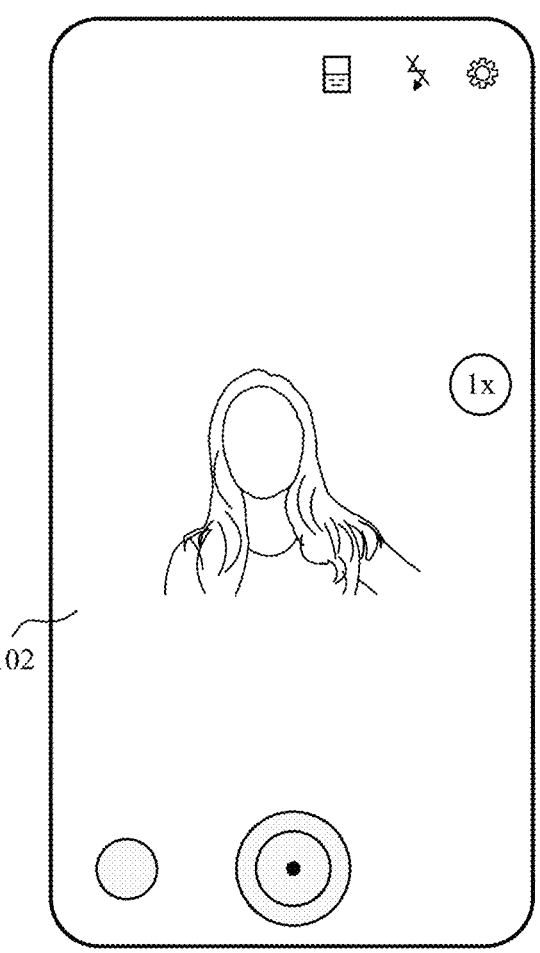

Referring to the preview window 102 in FIG. 2A, when the user extends the palm to slide left, the electronic device 100 can capture an image frame sequence including the foregoing gesture. By recognizing the image frame sequence, the electronic device 100 can determine that the user performs the left-sliding gesture. Referring to FIG. 2B, in response to recognition of the left-sliding gesture, the electronic device 100 can close the preview window 101. In this case, the electronic device 100 can display, in a full-screen mode, an image captured by the front camera in the original preview window 102, that is, switch from the "front/back" mode shown in FIG. 1A to the "front" mode.

In the shooting scenario shown in FIG. 2B, the user can perform a left-sliding gesture to control the electronic device 100 to re-display the two preview windows, thereby switching from the "front" mode shown in FIG. 2B to the "front/back" shooting mode.

Figure 2C:
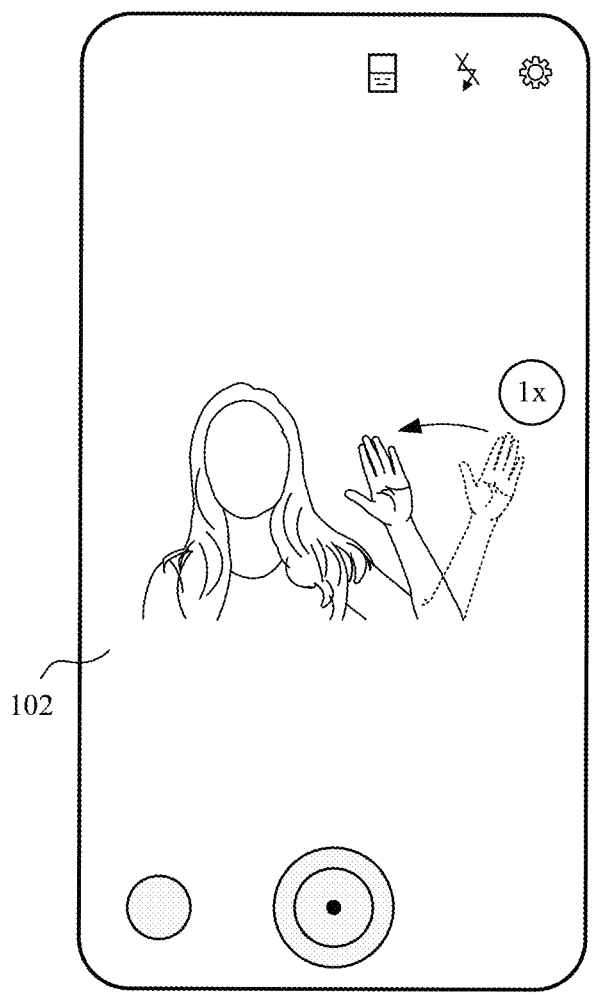
Figure 2D:
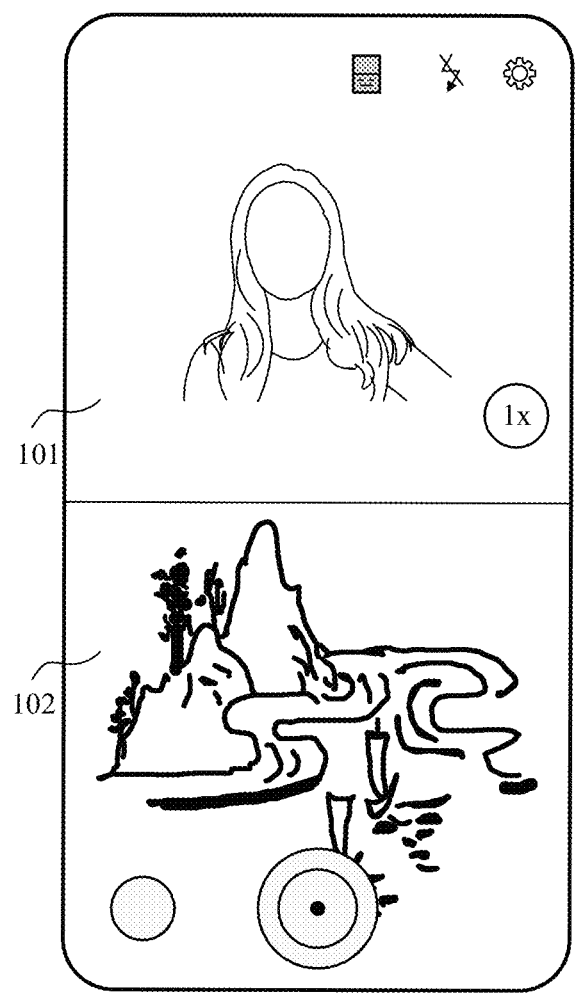

Likewise, referring to the preview window 102 in FIG. 2C, when the user performs the left-sliding gesture, the electronic device 100 can capture an image frame sequence including the foregoing gesture. Referring to FIG. 2D, in response to recognition of the left-sliding gesture, the electronic device 100 can re-display the preview window 101. In this case, the preview window 101 can display an image captured by the front camera, and the preview window 102 can display an image captured by the back camera.

Figure 2E:
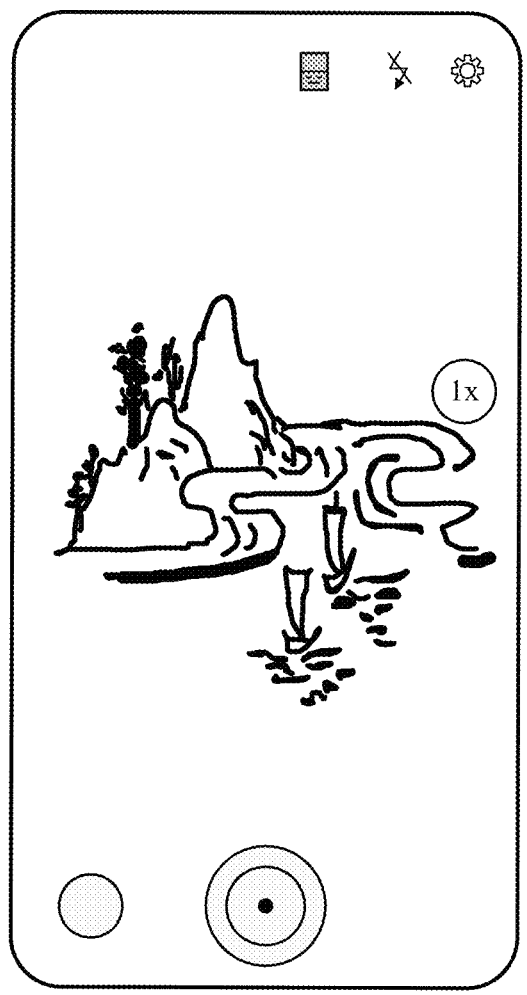

Referring to FIG. 2E, in the shooting scenario shown in FIG. 2D, the electronic device 100 can re-recognize a left-sliding gesture performed by the user, and in response to recognition of the left-sliding gesture, the electronic device 100 can re-close the preview window 101. The electronic device 100 can display, in the full-screen mode, an image captured by the back camera in the original preview window 102, that is, switch from the "front/back" mode shown in FIG. 2D to the "back" shooting mode. Then, referring to FIG. 2F, after detecting a left-sliding gesture performed by the user, the electronic device 100 can re-display the preview window 101, that is, return to the "front/back" dual-view shooting mode. In this case, the preview window 101 can display an image captured by the back camera, and the preview window 102 can display an image captured by the back camera.

It may be understood that, in the scenario shown in FIG. 2E, although the electronic device 100 does not display the image captured by the front camera, the front camera is still in a working state. The electronic device 100 can recognize the image captured by the front camera. Therefore, in the scenario shown in FIG. 2E, when recognizing that the image captured by the front camera includes the left-sliding gesture, the electronic device 100 can perform switching from FIG. 2E to FIG. 2F.

In addition, without being limited to the front camera, the electronic device 100 can further recognize the image captured by the back camera. When recognizing that the image captured by the back camera includes the left-sliding gesture, the electronic device 100 can also perform switching from FIG. 2E to FIG. 2F.

Figure 2F:
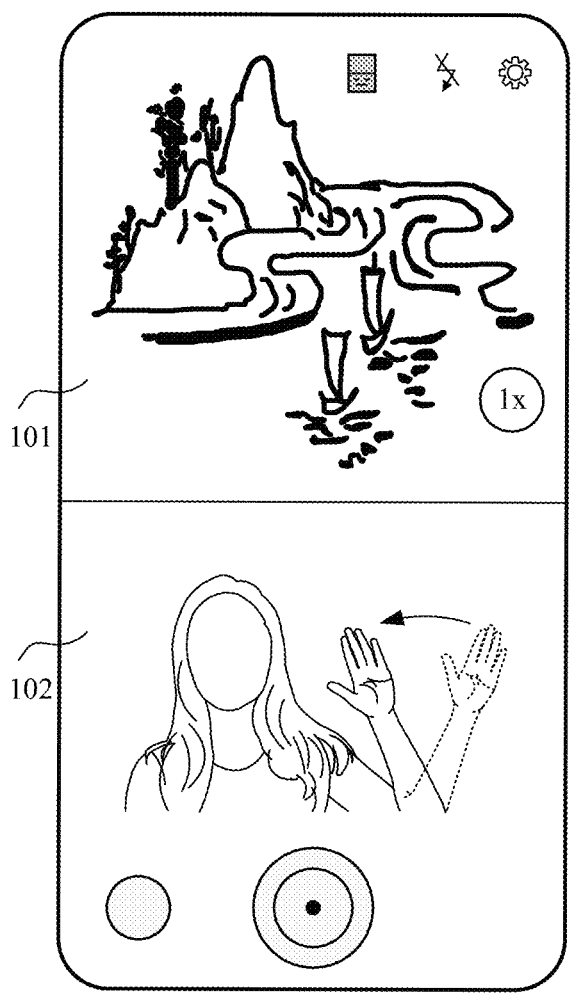

In this case, a shooting state shown in FIG. 2F is the same as that shown in FIG. 2A. To be specific, in a shooting state shown in FIG. 2E, after detecting the left-sliding gesture, the electronic device 100 can return to the "front/back" mode shown in FIG. 2A. In addition, the preview window 101 displays an image captured by the back camera, and the preview window 102 displays an image captured by the back camera.

By analogy, in a process of recognizing a left-sliding gesture of the user for a plurality of times, the electronic device 100 can repeat the process shown in FIG. 2A to FIG. 2E, so that the user controls switching of the dual-view shooting mode by using the left-sliding gesture.

The foregoing repetition of the control method shown in FIG. 2A to FIG. 2E can be summarized as follows: In the "front/back" mode for upper and lower split-screen displaying, the electronic device 100 can close an upper preview window (preview window 101) every time a left-sliding gesture of the user is recognized, so that an image captured by a camera corresponding to a lower preview window (preview window 102) is displayed in the full-screen mode. In the "front" or "back" shooting mode, every time a left-sliding gesture of the user is recognized, the electronic device 100 splits a full-screen preview window into an upper preview window and a lower preview window (preview window 101 and preview window 102), and displays, in the preview window 101, an image currently displayed in the full-screen mode, and displays, in the preview window 102, an image captured by a camera corresponding to the preview window 101 closed in a previous process.

Figure 2G:
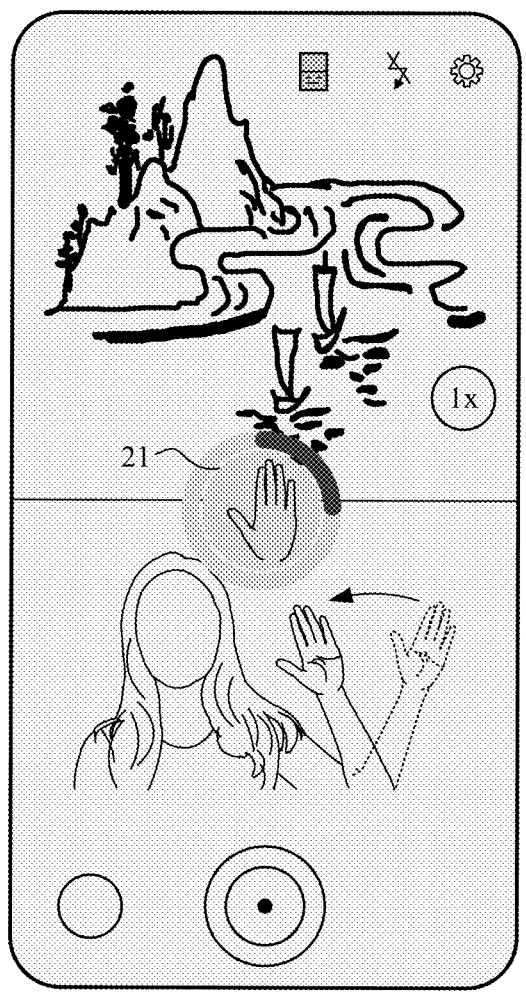

It may be understood that, using FIG. 2A as an example, in the process of recognizing the left-sliding gesture of the user as shown in FIG. 2A, after detecting that the user raises the palm, the electronic device 100 can display the user interface shown in FIG. 2G. The user interface may include a control 21. The control 21 may identify that an action of raising the palm by the user is detected. The control 21 includes an annular loading circle (for example, a black part in the figure identifies progress, and a grey part identifies remaining time). The loading circle may represent a timer. The loading circle may prompt the user to complete the gesture before loading of the loading circle is completed. In this case, the electronic device 100 recognizes that an image frame captured when the user raises the palm to an image frame captured when loading of the loading circle is completed are image frames for the electronic device 100 to recognize the gesture of the user.

In some embodiments, the control 21 may further instruct the user to complete the gesture after the loading of the loading circle is completed. In this case, the electronic device 100 may obtain image frames in a period of time after the loading of the loading circle is completed as image frames for the electronic device 100 to recognize the gesture of the user. Optionally, the control 21 may not be displayed. When recognizing that the user starts the action of raising the palm, the electronic device obtains image frames in a period of time after the start as image frames for the electronic device 100 to recognize the gesture of the user.

Figure 2H:
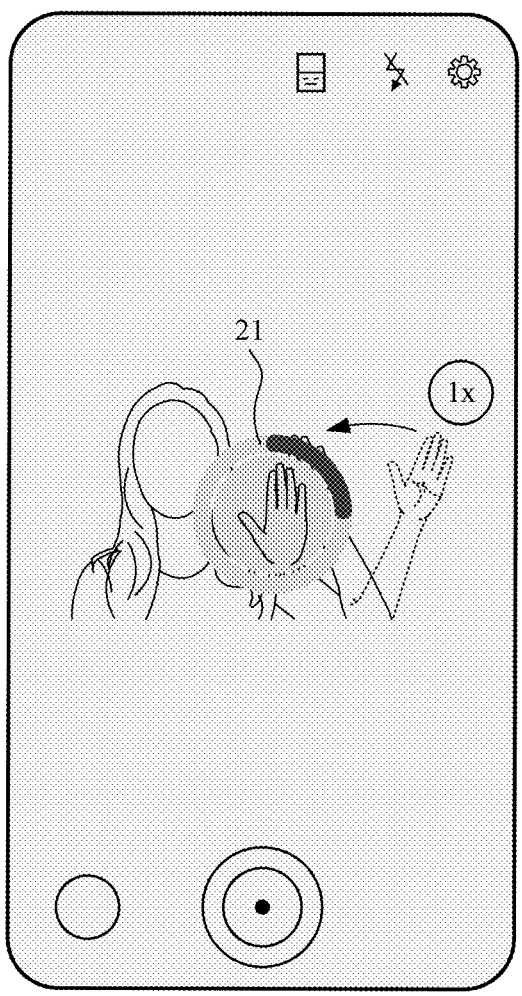
Figure 2I:
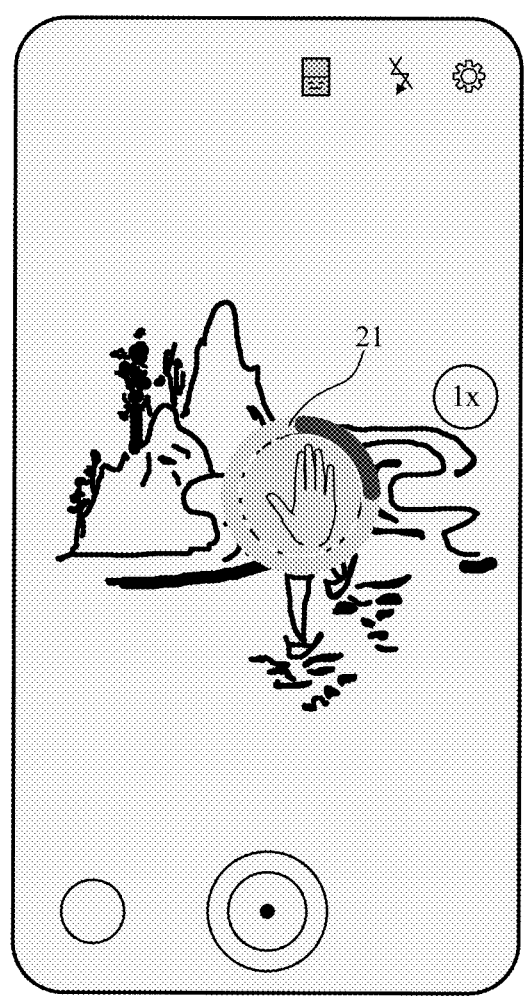

Subsequently, in the user interface in which a left-sliding gesture performed by the user is detected in FIG. 2C, FIG. 2E, or the like, after detecting that the user raises the palm, the electronic device 100 also correspondingly displays the control 21 to instruct the user to complete the gesture, and obtains an image frame when the user completes the gesture, where the image frame is used to recognize the gesture completed by the user. Refer to FIG. 2H and FIG. 2I. The subsequent embodiment is not described in detail again.

The electronic device 100 can further recognize a right-sliding gesture of the user, and further control the change of the dual-view shooting mode.

For example, in the shooting scenario shown in FIG. 1A, the user can extend the palm to slide right to control the electronic device 100 to close the preview window 102, thereby switching from the "front/back" mode shown in FIG. 1A to the "front" or "back" shooting mode in a manner different from that shown in FIG. 2A to FIG. 2E.

Figure 3A:
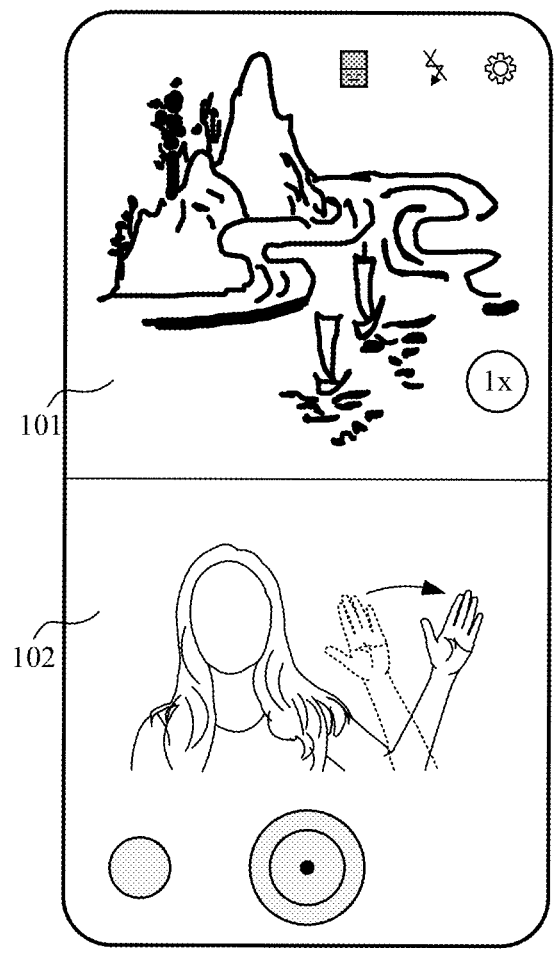
Figure 3B:
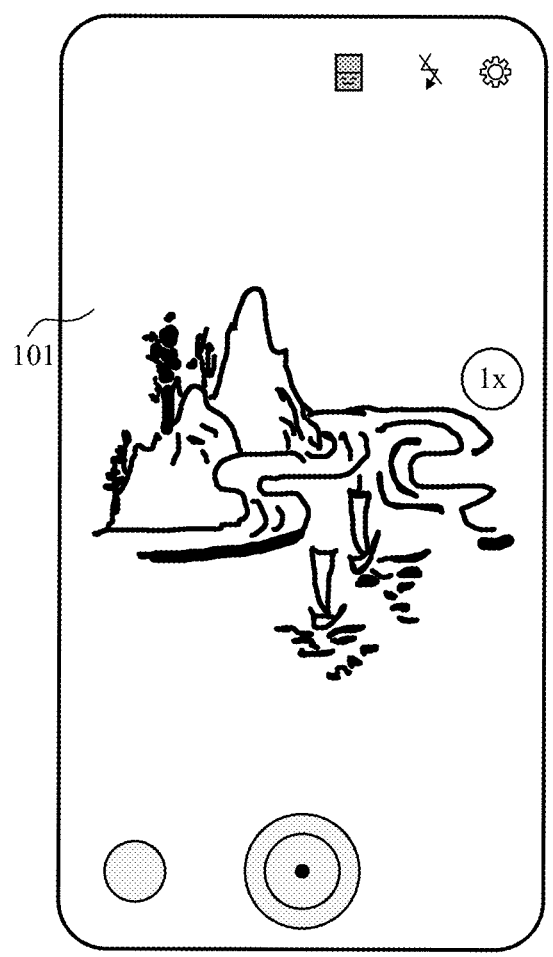

Referring to the preview window 102 in FIG. 3A, when the user extends the palm to slide right, the electronic device 100 can capture an image frame sequence including the foregoing gesture. By recognizing the image frame sequence, the electronic device 100 can determine that the user performs the right-sliding gesture. Referring to FIG. 3B, in response to recognition of the right-sliding gesture, the electronic device 100 can close the preview window 102. In this case, the electronic device 100 can display, in the full-screen mode, an image captured by the back camera in the original preview window 101, that is, switch from the "front/back" mode shown in FIG. 1A to the "back" mode.

In the shooting scenario shown in FIG. 3B, the user can perform a right-sliding gesture to control the electronic device 100 to re-display the two preview windows, thereby switching from the "back" mode shown in FIG. 3B to the "front/back" shooting mode.

When the electronic device 100 displays the user interface shown in FIG. 3B, that is, when an image including a portrait captured by the front camera is not displayed, the front camera of the electronic device 100 can capture an image and recognize whether the user performs a right-sliding gesture. Referring to FIG. 3C, in response to recognition of the right-sliding gesture performed by the user, the electronic device 100 can re-display the preview window 102, that is, return to the "front/back" dual-view shooting mode. In this case, the preview window 101 can display an image captured by the front camera, and the preview window 102 can display an image captured by the back camera.

Figure 3E:
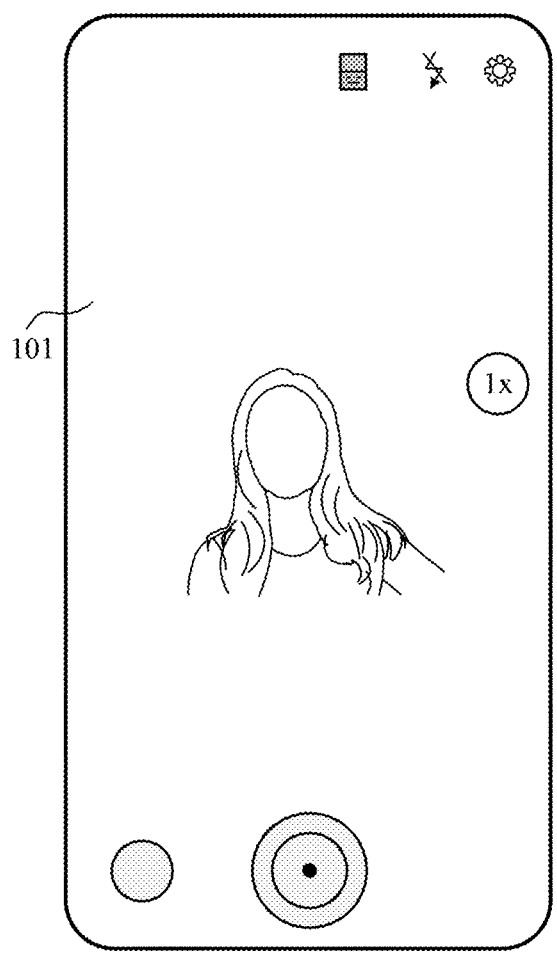

Referring to FIG. 3D, in the shooting scenario shown in FIG. 3C, the electronic device 100 can re-recognize a right-sliding gesture of the user. Referring to FIG. 3E, in response to recognition of the right-sliding gesture, the electronic device 100 can re-close the preview window 102. In this case, the electronic device 100 can display, in the full-screen mode, an image captured by the front camera in the original preview window 101, that is, switch from the "front/back" mode shown in FIG. 3D to the "front" mode.

Figure 3F:
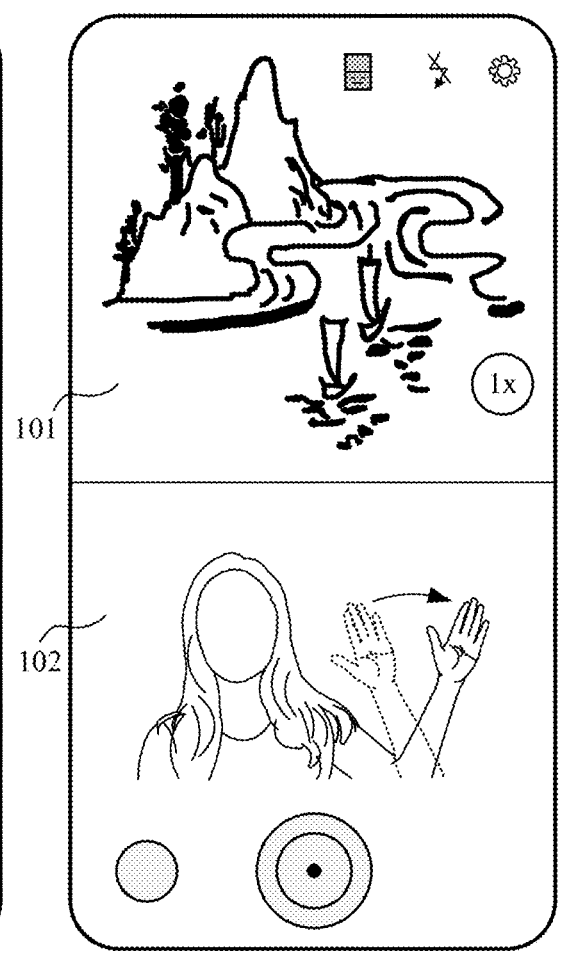

Then, referring to FIG. 3F, after detecting a right-sliding gesture performed by the user, the electronic device 100 can re-display the preview window 102. In this case, the preview window 101 can display an image captured by the back camera, and the preview window 102 can display an image captured by the back camera. In this case, a shooting state shown in FIG. 3F is the same as that shown in FIG. 3A. To be specific, in a shooting state shown in FIG. 3E, after detecting a left-sliding gesture, the electronic device 100 can return to the "front/back" mode shown in FIG. 3A. In addition, the preview window 101 displays an image captured by the back camera, and the preview window 103 displays an image captured by the back camera.

By analogy, in a process of recognizing a right-sliding gesture of the user for a plurality of times, the electronic device 100 can repeat the process shown in FIG. 3A to FIG. 3E, so that the user controls switching of the dual-view shooting mode by using the right-sliding gesture.

The electronic device 100 can further recognize a flipping gesture. The flipping gesture means: the hand with the palm open and the palm facing the electronic device 100 is turned upside down with the palm open and the back of the hand facing the electronic device 100, or the hand with the palm open and the back of the hand facing the electronic device 100 is turned upside down with the palm open and the palm facing the electronic device 100. The flipping gesture may be used to control the electronic device 100 to switch between images displayed in the preview windows.

For example, in the shooting scenario shown in FIG. 1A, the user can perform a flipping gesture to control the electronic device 100 to interchange images displayed in the preview window 101 and the preview window 102.

Specifically, referring to the preview window 102 in FIG. 4A, when the user performs the flipping gesture, the electronic device 100 can capture an image frame sequence including the foregoing gesture. Referring to FIG. 4B, in response to recognition of the flipping gesture, the electronic device 100 can display an image including a portrait of the user and captured by the front camera (image displayed in the original preview window 102) in the preview window 101, and display an image captured by the front camera (image displayed in the original preview window 101) in the preview window 102, that is, interchange the images displayed in the preview window 101 and the preview window 102.

Figure 4C:
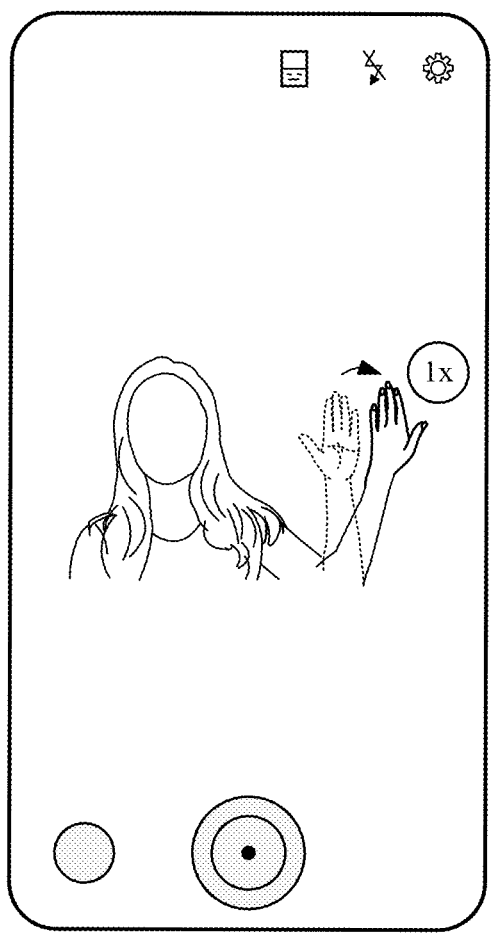
Figure 4D:
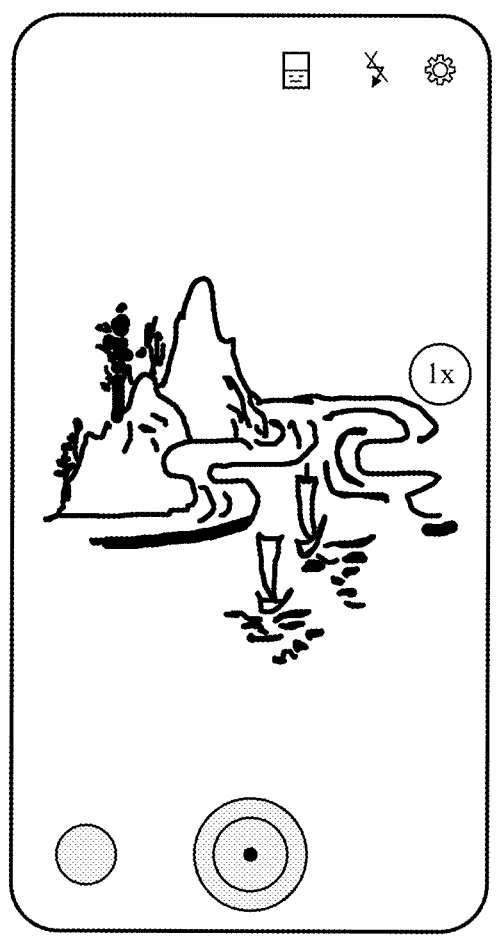

As shown in FIG. 4C and FIG. 4D, in a scenario in which the electronic device 100 is displaying an image captured by the front camera in the full-screen mode, when detecting that the user performs a flipping gesture, the electronic device 100 can switch from the image currently being displayed on the screen and captured by the front camera to an image captured by the back camera.

Conversely, in a scenario in which the electronic device 100 is displaying an image captured by the back camera in the full-screen mode, when detecting that the user performs a flipping gesture, the electronic device 100 can switch from the image currently being displayed on the screen and captured by the back camera to an image captured by the front camera.

The electronic device 100 can further recognize a first clenching gesture. The first clenching gesture is a gesture in which fingers bend toward the palm to change the open palm with five fingers into a fist. The first clenching gesture may be used to control the electronic device 100 to switch dual-view shooting in the "picture-in-picture" mode.

Figure 5A:
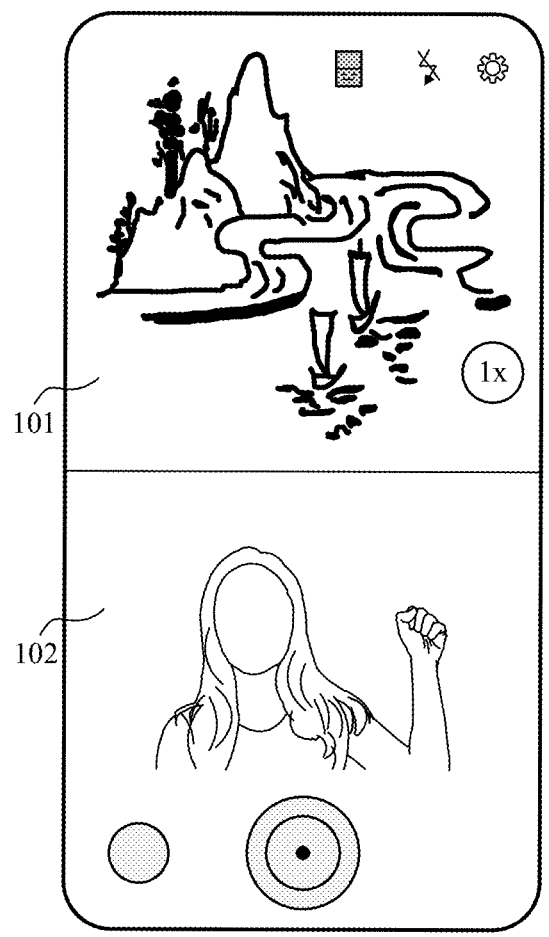
FIG. 5A and FIG. 5B are a group of user interfaces for switching a dual-view shooting mode by recognizing a first clenching gesture according to an embodiment of this application.
Figure 5B:
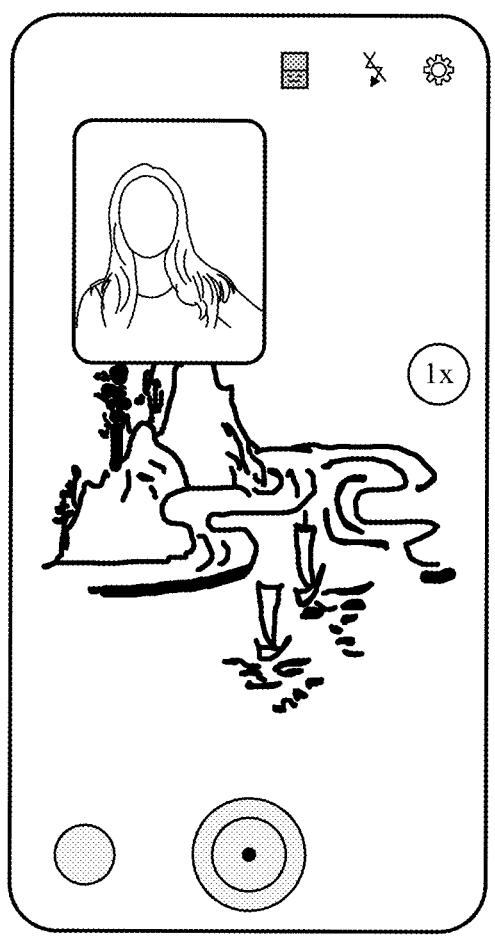

In the shooting scenario shown in FIG. 1A, the user can perform a first clenching gesture. Referring to the preview window 102 in FIG. 5A, when the user performs the flipping gesture, the electronic device 100 can capture an image frame including the foregoing gesture. Referring to FIG. 5B, in response to recognition of the first clenching gesture, the electronic device 100 can embed an image captured by the front camera in a form of a small window into an image that is captured by the back camera and displayed in the full-screen mode, that is, "picture-in-picture".

Without being limited to the dual-view shooting modes such as "front/back", "back/back", and "picture-in-picture" described in the foregoing embodiment, the electronic device 100 can further support other types of dual-view shooting or multi-view shooting. Correspondingly, without being limited to the left-sliding, right-sliding, flipping, and first clenching gestures described in the foregoing embodiment, the electronic device 100 can further recognize other forms of gestures. This is not limited in this embodiment of this application.

In the plurality of gestures described above, the left-sliding and right-sliding gestures are very similar to a waving gesture performed when the user meets a person and greets or says goodbye. Therefore, the electronic device 100 is likely to recognize the waving gesture performed by the user as a left-sliding or right-sliding gesture. In some embodiments, the waving gesture is not associated with a particular control operation. In this case, recognizing the waving gesture as a left-sliding or right-sliding gesture causes a control switching operation that is not intended by the user, that is, the user does not require the electronic device 100 to perform any action, but the electronic device 100 performs some operations by itself. In some embodiments, the waving gesture may alternatively be associated with a particular control operation. In this case, recognizing the waving gesture as a left-sliding or right-sliding gesture has the following consequence: An action that the user wants the electronic device 100 to perform is not performed, but the electronic device 100 performs an operation not desired by the user.

To avoid the foregoing case, the electronic device 100 can recognize the user's hand position change track in an image frame sequence to more accurately determine whether the user performs a waving gesture or a sliding (left-sliding or right-sliding, where the right-sliding is used as an example subsequently) gesture.

Figure 6A:
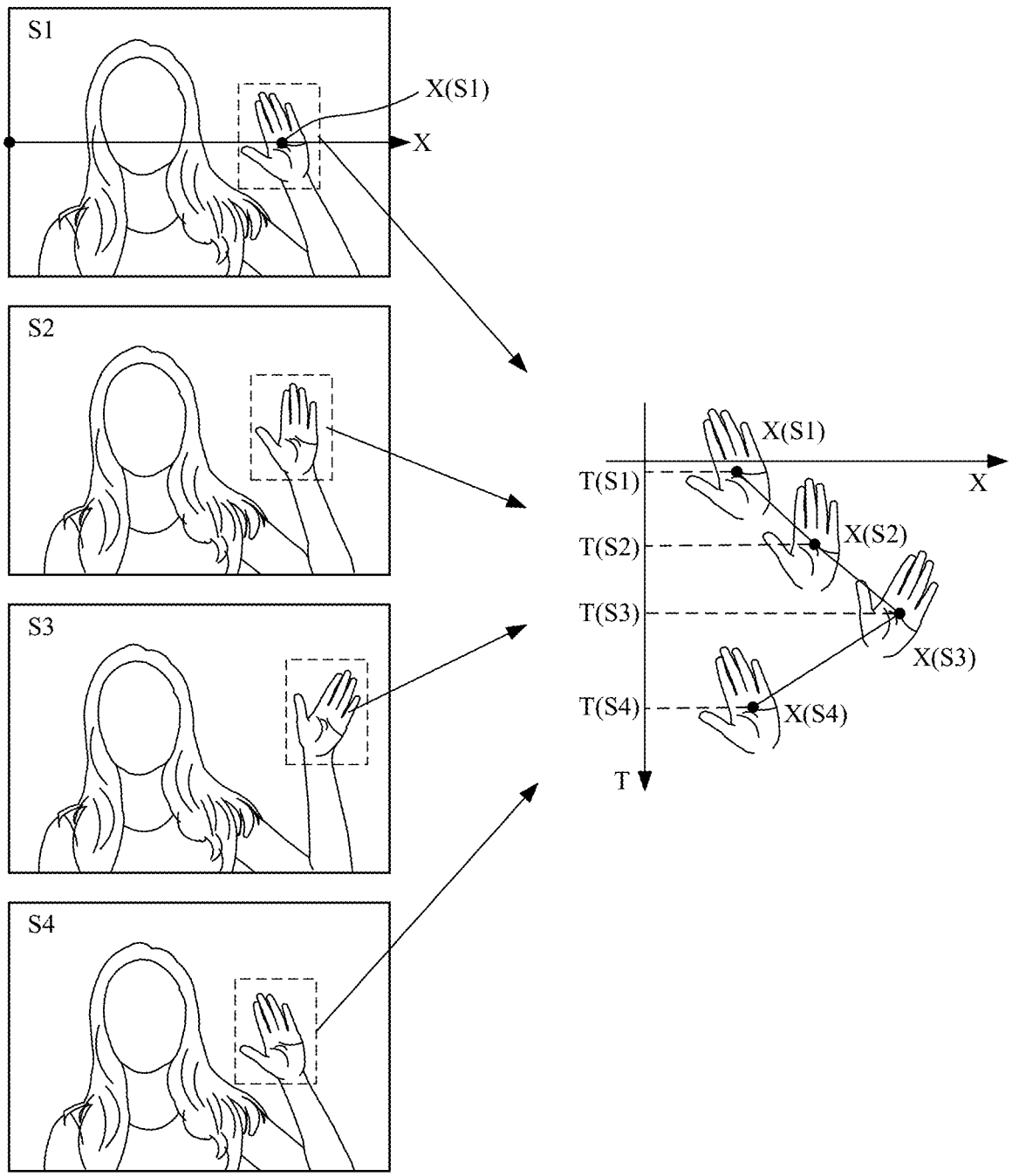
FIG. 6A is a schematic diagram of a moving track of a waving gesture according to an embodiment of this application.
Figure 6B:
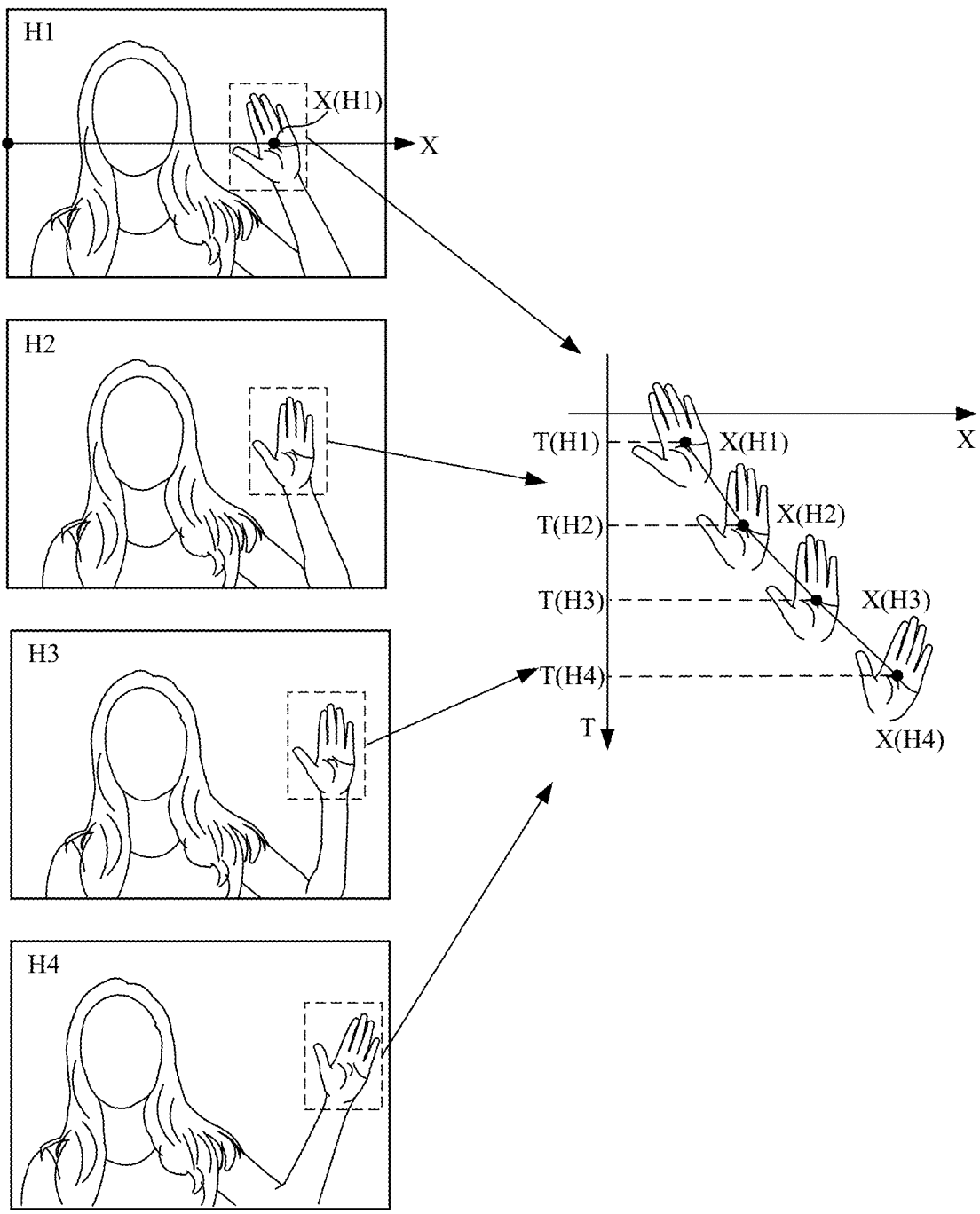
FIG. 6B is a schematic diagram of a moving track of a right-sliding gesture according to an embodiment of this application.

Specifically, FIG. 6A and FIG. 6B are respectively schematic diagrams of the user's hand position change tracks when waving and left-sliding gestures are performed.

First, referring to FIG. 6A, FIG. 6A is a schematic diagram of the user's hand position change track when a waving gesture is performed. FIG. 6A shows four frames of images captured by the electronic device 100 when the user performs the waving gesture, where the four frames of images are denoted as S1, S2, S3, and S4. Among the four frames of images, S1 is captured by the electronic device 100 first, then S2 and S3, and finally S4.

S1, S2, S3, and S4 may be four frames of images that are adjacent or not adjacent. For example, S1, S2, S3, and S4 may be respectively an $N^{th}$ frame of image, an $(N+1)^{th}$ frame of image, an $(N+2)^{th}$ frame of image, and an $(N+3)^{th}$ frame of image captured by the electronic device 100. Alternatively, S1, S2, S3, and S4 may be respectively an $N^{th}$ frame of image, an $(N+Q)^{th}$ frame of image, an $(N+2Q)^{th}$ frame of image, and an $(N+3Q)^{th}$ frame of image captured by the electronic device 100. Alternatively, S1, S2, S3, and S4 may be respectively an $N^{th}$ frame of image, an $(N+Q1)^{th}$ frame of image, an $(N+Q2)^{th}$ frame of image, and an $(N+Q3)^{th}$ frame of image captured by the electronic device 100, where $Q1<Q2<Q3$. Likewise, in FIGS. 6B, H1, H2, H3, and H4 are also applicable, and details are not described again subsequently.

After recognizing the user's hand in an image frame, the electronic device 100 can determine a horizontal position of the hand in the image frame. The horizontal position may be indicated by a horizontal x-axis. An origin of the x-axis of the image frame may be a start position of a pixel on the left side of the image frame, or may be a position of a central point of the user's head, or the like. This is not limited in this embodiment of this application.

For example, using S1 as an example, and using a start pixel on the left side of the image frame as the origin and a direction from left to right as a positive direction of the x-axis, the horizontal position of the user's hand may be expressed as X(S1). By analogy, horizontal positions of the user's hand in S2, S3, and S4 are X(S2), X(S3), and X(S4) in sequence.

A sequence of capturing S1, S2, S3, and S4 by the electronic device 100 is: S1, S2, S3, S4, that is, the electronic device 100 captures S1 first, then S2 and S3, and finally S4. S1, S2, S3, and S4 captured by the electronic device 100 may be denoted as T(S1), T(S2), T(S3), and T(S4), respectively. Images captured earlier are closer on a time axis to the origin of the time axis. Therefore, $T(S1)<T(S2)<T(S3)<T(S4)$.

A two-dimensional spatial coordinate system may be established in FIG. 6A by using the time when an image frame appears as a vertical coordinate axis and a horizontal position of the hand as a horizontal coordinate axis. Referring to the right drawing in FIG. 6A, a schematic diagram of a hand position change track can be obtained by inputting the horizontal positions of the hand in the image frames into the two-dimensional spatial coordinate system in an order of occurrence time of the image frames. As shown in FIG. 6A, a hand position in the image frame S1 obtained at a time T(S1) on the horizontal axis is X(S1); a hand position in the image frame S2 obtained at a time T(S2) on the horizontal axis is X(S2); a hand position in the image frame S3 obtained at a time T(S3) on the horizontal axis is X(S3); and a hand position in the image frame S4 obtained at a time T(S4) on the horizontal axis is X(S4). The diagram may indicate the moving track of the user's hand in the image frames when the user performs the waving gesture.

In the right drawing, X(S1), X(S2), and X(S3) sequentially increase. This process may indicate that the user's hand is moving to the right. X(S3) to X(S4) decrease sharply. This process may indicate that the moving direction of the user's hand has changed, that is, moved to the left from the position shown at X(S3) to the position shown at X(S4). The user's hand may continue to move to the left. When reaching a position, the user's hand changes the direction again to move to the right. Such reciprocal left-right movements of the hand constitute the waving gesture of the user.

Referring to FIG. 6B, FIG. 6B is a schematic diagram of the user's hand position change track when a right-sliding gesture is performed. FIG. 6B shows four frames of images captured by the electronic device 100 when the user performs the waving gesture, where the four frames of images are denoted as H1, H2, H3, and H4. Among the four frames of images, H1 is captured by the electronic device 100 first, then H2 and H3, and finally H4. H1, H2, H3, and H4 captured by the electronic device 100 may be denoted as T(H1), T(H2), T(H3), and T(H4), respectively. Images captured earlier are closer on a time axis to an origin of the time axis. Therefore, $T(H1)<T(H2)<T(H3)<T(H4)$.

Likewise, after recognizing the user's hand in an image frame, the electronic device 100 can determine a horizontal position X of the hand in the image frame. In this case, horizontal positions of the user's hand in H1, H2, H3, and H4 can be expressed as X(H1), X(H2), X(H3), and X(H4) respectively.

Likewise, a two-dimensional spatial coordinate system may be established by using the time when an image frame appears as a vertical coordinate axis and a horizontal position of the hand as a horizontal coordinate axis. Referring to the right drawing in FIG. 6B, a schematic diagram of a hand position change track can be obtained by inputting the horizontal positions of the hand in the image frames into the two-dimensional spatial coordinate system in an order of occurrence time of the image frames. As shown in FIG. 6B, a hand position in the image frame H1 obtained at a time T(H1) on the horizontal axis is X(H1); a hand position in the image frame H2 obtained at a time T(H2) on the horizontal axis is X(H2); a hand position in the image frame H3 obtained at a time T(H3) on the horizontal axis is X(H3); and a hand position in the image frame H4 obtained at a time T(H4) on the horizontal axis is X(H4). The diagram may indicate the moving track of the user's hand in the image frames when the user performs the waving gesture.

In the right drawing, X(H1), X(H2), X(H3), and X(H4) sequentially increase. This process may indicate that the user's hand is moving to the right. In the process of completing the gesture by the user, as shown in the image frames H1, H2, H3, and H4, it is found that the user's hand is always moving to the right, and the moving direction is unchanged. Therefore, the track shown in H1, H2, H3, and H4 is the moving track of the right-sliding gesture.

A moving track of a left-sliding gesture is opposite to the moving track of the right-sliding gesture shown in FIG. 6B and is not described in detail herein.

The moving track of the waving gesture shown in FIG. 6A and the moving track of the right-sliding gesture shown in FIG. 6B show that a difference between the waving gesture and the sliding (left-sliding or right-sliding) gesture is that the waving gesture includes movements in two directions, that is, a horizontal left direction and a horizontal right direction, while the sliding is unidirectional (a moving direction of the hand in left-sliding is the left direction; and a moving direction of the hand in right-sliding is the right direction). Based on the foregoing rules, the electronic device 100 can determine, based on whether there are movements in the two directions, whether the user is performing a waving gesture or a sliding gesture.

Figure 7:
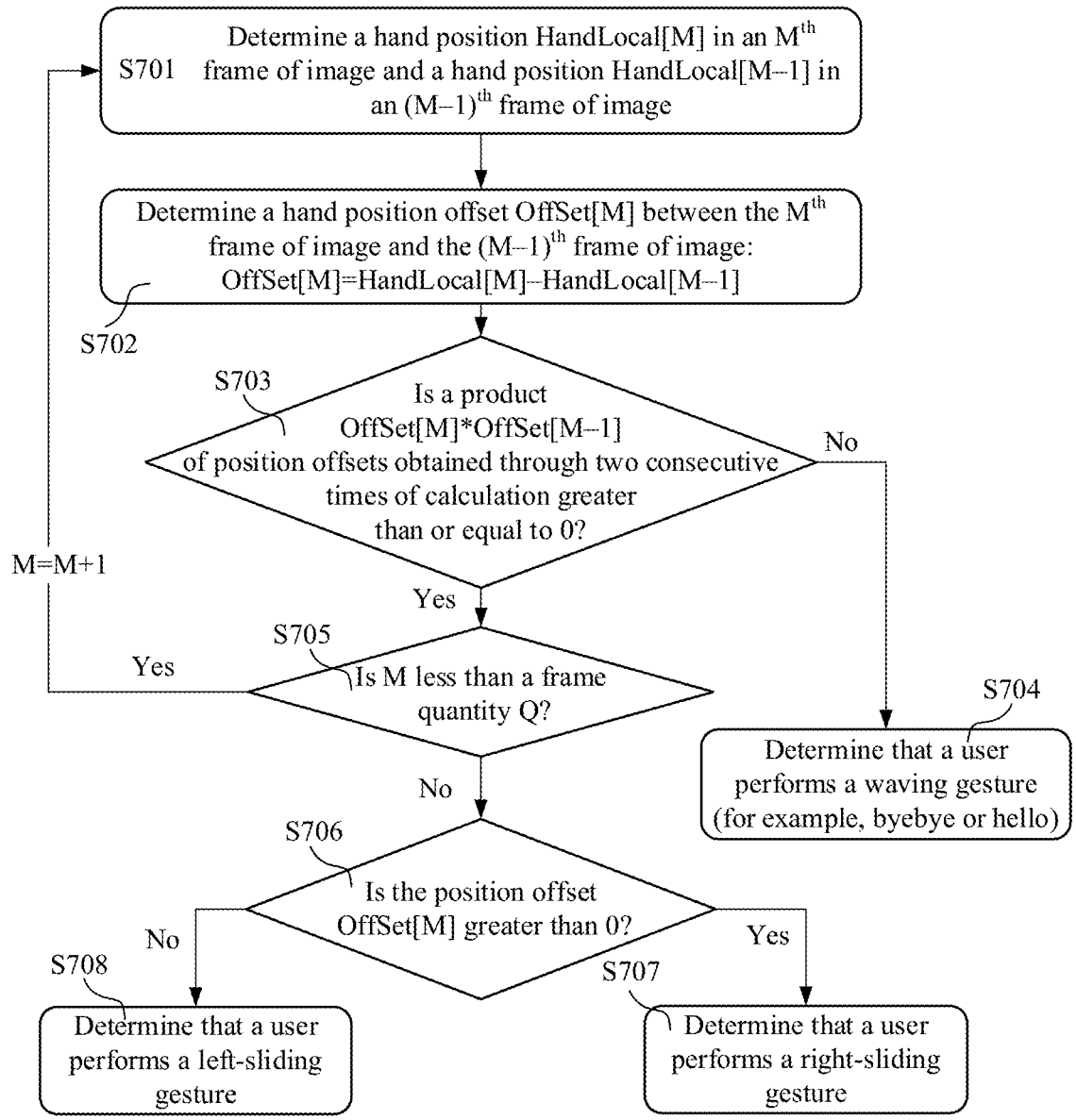
FIG. 7 is a flowchart for recognizing a waving gesture or a sliding (left-sliding or right-sliding) gesture by an electronic device according to an embodiment of this application.

FIG. 7 is a flowchart of a method for recognizing a waving gesture and a sliding gesture by using a moving direction.

Assuming that it takes a user one second to complete a waving or sliding gesture and that an electronic device 100 can capture 30 frames of images within one second, the electronic device 100 can recognize, by using the 30 frames of images, the gesture performed by the user. It may be understood that, in practice, the electronic device 100 can continuously capture images. In this case, the electronic device 100 may use every 30 frames of images as a group of images, and use each group of images to recognize whether the user performs a gesture such as waving or sliding.

The one second may be referred to as gesture duration. The 30 frames may be referred to as a frame quantity Q. The frame quantity Q is not limited to 30 frames, but may be 60 frames, or the like. A specific value of the frame quantity Q may vary depending on a frame rate at which a video is shot.

The following uses an image frame sequence (original image sequence) whose frame quantity is 30 as an example to describe in detail a process in which the electronic device 100 recognizes the original image sequence and determines that the user performs a waving gesture or a sliding gesture.

S701. Determine a hand position HandLocal[M] in an $M^{th}$ frame of image and a hand position HandLocal[M−1] in an $(M−1)^{th}$ frame of image.

In this embodiment of this application, the hand position in the image frame is a position (horizontal position or a position on an x-axis) of a region including a hand image of the user in a horizontal direction in the image frame. Referring to the image frame S1 in FIG. 6A, X(S1) may be referred to as a hand position in the image frame S1, and is denoted as HandLocal[S1].

A hand position in a first frame of image may be denoted as HandLocal[1]. By analogy, it may be determined that the hand position in the $M^{th}$ frame of image may be denoted as HandLocal[M].

The electronic device 100 can obtain the $M^{th}$ frame of image and the $(M−1)^{th}$ frame of image from the original image sequence whose frame quantity is Q (Q=30), where M is a positive integer from 2 to Q. Then the electronic device 100 can determine hand positions HandLocal[M] and HandLocal[M−1] in the $M^{th}$ frame of image and the $(M−1)^{th}$ frame of image.

With reference to the user interface shown in FIG. 2G, after the electronic device 100 recognizes that the user raises the palm, a video frame captured within preset duration by the electronic device 100 may be used as the $M^{th}$ frame of image. Which video frame captured within the preset duration is selected as the $M^{th}$ frame of image is selected based on the foregoing description. Details are not described herein again. For example, any frame of image in the image frame sequence captured by the electronic device 100 may be used as the $M^{th}$ frame of image in a process of displaying the gesture that the user is instructed to complete as shown in FIG. 2G.

S702. Determine a hand position offset OffSet[M] between the $M^{th}$ frame of image and the $(M−1)^{th}$ frame of image.

After determining HandLocal[M] and HandLocal[M−1], the electronic device 100 can use the HandLocal[M] and HandLocal[M−1] to determine the hand position offset between the $M^{th}$ frame of image and the $(M−1)^{th}$ frame of image, denoted as OffSet[M], where $$OffSet[M] = HandLocal[M] - HandLocal[M-1].$$

Assumption: A hand position in the $M^{th}$ frame of image on the x-axis is X=1000, that is, HandLocal[M]=1000; and a hand position in the $(M−1)^{th}$ frame of image on the x-axis is X=899, that is, HandLocal[M−1]=899. In this case, the hand position offset OffSet[M] between the $M^{th}$ frame of image and the $(M−1)^{th}$ frame of image is:

$$OffSet[M] = HandLocal[M] - HandLocal[M-1] = 1000 - 899 = 101.$$

S703. Calculate a product of two adjacent position offsets and determine whether the product is greater than or equal to 0.

After determining the hand position offset OffSet[M] between the $M^{th}$ frame of image and the $(M−1)^{th}$ frame of image, the electronic device 100 can determine a product of OffSet[M] and OffSet[M−1], that is, OffSet[M]*OffSet[M−1], and determine whether the product is greater than or equal to 0. The OffSet[M−1] is a position offset between the hand position in the $(M-1)^{th}$ frame of image and a hand position in an $(M-2)^{th}$ frame of image. For a process of calculating the position offset, refer to the foregoing S701 and S702. Details are not described herein again.

OffSet[M]*OffSet[M−1]>0 may indicate OffSet[M]>0 and OffSet[M−1]>0, or OffSet[M]<0 and OffSet[M−1]<0, that is, a moving direction of the hand in the $(M-2)^{th}$ frame and the $(M-1)^{th}$ frame is the same as a moving direction of the hand in the $(M-1)^{th}$ frame and the $M^{th}$ frame. In other words, a reciprocal left-right moving state does not occur in two movements formed by the $(M-2)^{th}$ frame, the $(M-1)^{th}$ frame, and the $M^{th}$ frame.

When OffSet[M]*OffSet[M−1]<0, OffSet[M]<0 and OffSet[M−1]>0, or OffSet[M]>0 and OffSet[M−1]<0. This means that the moving direction of the user's hand from the position in the $(M-2)^{th}$ frame of image to the position in the $(M-1)^{th}$ frame of image is opposite to the moving direction from the position in the $(M-1)^{th}$ frame of image to the position in the $M^{th}$ frame of image. In this case, a moving track of the hand in the $(M-2)^{th}$ frame of image, the $(M-1)^{th}$ frame of image, and the $M^{th}$ frame of image shows a reciprocal left-right moving state.

Therefore, by determining whether the product (OffSet[M]*OffSet[M−1]) of the two position offsets is greater than or equal to 0, the electronic device 100 can determine whether the reciprocal left-right moving state occurs in the original image sequence, and further determine whether the gesture performed by the user is a waving gesture or a sliding gesture.

S704. If OffSet[M]*OffSet[M−1]≥0 is false, the electronic device 100 can determine that the user performs a waving gesture.

That OffSet[M]*OffSet[M−1]≥0 is false indicates that in the moving track of the hand reflected by the $(M-2)^{th}$ frame of image, the $(M-1)^{th}$ frame of image, and the $M^{th}$ frame of image, two moving directions are inconsistent, which means that at least one group of reciprocal left-right moving states exists in the original image sequence. As can be known from the schematic diagrams of the moving tracks of the waving gesture and the sliding gesture shown in FIG. 6A and FIG. 6B, a difference between the waving gesture and the sliding gesture lies in that the sliding gesture does not include a moving state with different moving directions. Therefore, when a group of reciprocal left-right moving states occurs, the electronic device 100 can determine that the gesture performed by the user is not a left-sliding or right-sliding gesture, but a waving gesture.

S705. If OffSet[M]*OffSet[M−1]≥0 is true, the electronic device 100 can further determine whether M is less than the frame quantity Q.

When OffSet[M]*OffSet[M−1]≥0 is true, the electronic device 100 cannot determine that the gesture performed by the user is definitely a sliding gesture. This is because OffSet[M]*OffSet[M−1]≥0 can only prove that there is no reciprocal left-right moving state in the $(M-2)^{th}$ frame of image, the $(M-1)^{th}$ frame of image, and the $M^{th}$ frame of image, but cannot indicate that the reciprocal left-right moving state does not exist in the original image sequence. Therefore, when OffSet[M]*OffSet[M−1]≥0 is true, the electronic device 100 further needs to determine whether the $M^{th}$ frame of image is a last frame of image, that is, whether M is less than the frame quantity Q.

When the $M^{th}$ frame of image is the last frame of image (generally, M=Q), that is, M<Q is false, the electronic device 100 can determine that all image frames in the original image sequence have been recognized and that the reciprocal left-right moving state exists in none of the image frames. Therefore, the electronic device 100 can determine that the gesture performed by the user is a sliding gesture.

When the $M^{th}$ frame of image is not the last frame of image (M=Q), that is, M<Q is true, the electronic device 100 can only determine that a group of reciprocal left-right moving states does not exist in the first frame of image to the $M^{th}$ frame of image, but cannot determine that the reciprocal left-right moving state does not occur in the $M^{th}$ frame of image to a $Q^{th}$ frame of image, that is, cannot determine that the reciprocal left-right moving state definitely does not exist in the original image sequence (30 frames). This is also why after confirming OffSet[M]*OffSet[M−1]≥0, the electronic device 100 further needs to determine whether currently M is less than the frame quantity Q.

If M<Q is true, the electronic device 100 is currently unable to determine the gesture of the user, and further needs to recognize image frames subsequent to the $M^{th}$ frame of image to confirm whether the reciprocal left-right moving state occurs in the subsequent images.

Specifically, the electronic device 100 can perform M=M+1, that is, increase a value of M, and further calculate a position offset OffSet[M+1] between an $(M+1)^{th}$ frame of image and the $M^{th}$ frame of image, and then use OffSet[M+1]*OffSet[M]≥0 to determine whether a same direction is maintained in the $(M+1)^{th}$ frame, the $M^{th}$ frame, and the $(M-1)^{th}$ frame, and so on, until the last frame of image.

Optionally, the electronic device 100 may increase the value of M in a manner of M=M+N, where 1≤N<Q, and N is a positive integer. For example, using N=5 as an example, the electronic device 100 may increase the value of M in a manner of M=M+5, that is, there are four image frames (extract frames) between a previous frame and a next frame.

For example, with reference to the user interface shown in FIG. 2G, in a process of displaying the control 21, the image frame sequence captured by the electronic device 100 may be the foregoing Q frames of images. S1, S2, S3, and S4 may be an $N^{th}$ frame of image, an $(N+1)^{th}$ frame of image, an $(N+2)^{th}$ frame of image, and an $(N+3)^{th}$ frame of image in the Q frames of images. Alternatively, S1, S2, S3, and S4 may be an $N^{th}$ frame of image, an $(N+Q)^{th}$ frame of image, an $(N+2Q)^{th}$ frame of image, and an $(N+3Q)^{th}$ frame of image in the Q frames of images. Alternatively, S1, S2, S3, and S4 may be an $N^{th}$ frame of image, an $(N+Q1)^{th}$ frame of image, an $(N+Q2)^{th}$ frame of image, and an $(N+Q3)^{th}$ frame of image in the Q frames of images, where Q1<Q2<Q3.

Correspondingly, in the method of increasing the value of M in the manner of M=M+N, step S701 is changed to: determining the hand position HandLocal[M] in the $M^{th}$ frame of image and a hand position HandLocal[M−N] in an $(M-N)^{th}$ frame of image; and step S702 is changed to: determining a hand position offset OffSet[M] between the $M^{th}$ frame of image and the $(M-N)^{th}$ frame of image, where a product of two adjacent position offsets is OffSet[M]*OffSet[M−N].

S706. Confirm whether the position offset OffSet[M] is greater than 0.

After confirming that the user performs a sliding gesture, further, the electronic device 100 can determine, based on a direction of the position offset OffSet[M], whether the sliding gesture is specifically a left-sliding gesture or a right-sliding gesture.

Referring to the two-dimensional coordinate system in FIG. 6A and FIG. 6B, assuming that the horizontal direction from left to right is a positive direction of the x-axis, OffSet[M]≥0 may indicate that a movement from left to right, that is, right-sliding, occurs in hand positions in two adjacent frames of images. Conversely, OffSet[M]<0 may indicate that a movement from right to left, that is, left-sliding, occurs in hand positions in two adjacent frames of images.

It may be understood that if data such as HandLocal[M] and HandLocal[M−1] describing the hand positions in the images is obtained based on a positive direction of the x-axis from right to left, OffSet[M]≥0 indicates that left-sliding occurs in the hand positions in the two adjacent frames of images. Conversely, OffSet[M]<0 indicates that right-sliding occurs in the hand positions in the two adjacent frames of images.

S707. If OffSet[M]≥0 is true, the electronic device 100 can confirm that the user performs a right-sliding gesture.

In the coordinate system shown in FIG. 6A or FIG. 6B in which the horizontal direction from left to right is used as the positive direction of the x-axis, when confirming OffSet[M] ≥0, the electronic device 100 can confirm that the sliding gesture performed by the user is specifically a right-sliding gesture.

S708. If OffSet[M]≥0 is false, the electronic device 100 can confirm that the user performs a left-sliding gesture.

Conversely, when OffSet[M]<0, the electronic device 100 can confirm that the sliding gesture performed by the user is specifically a left-sliding gesture.

Figure 8A:
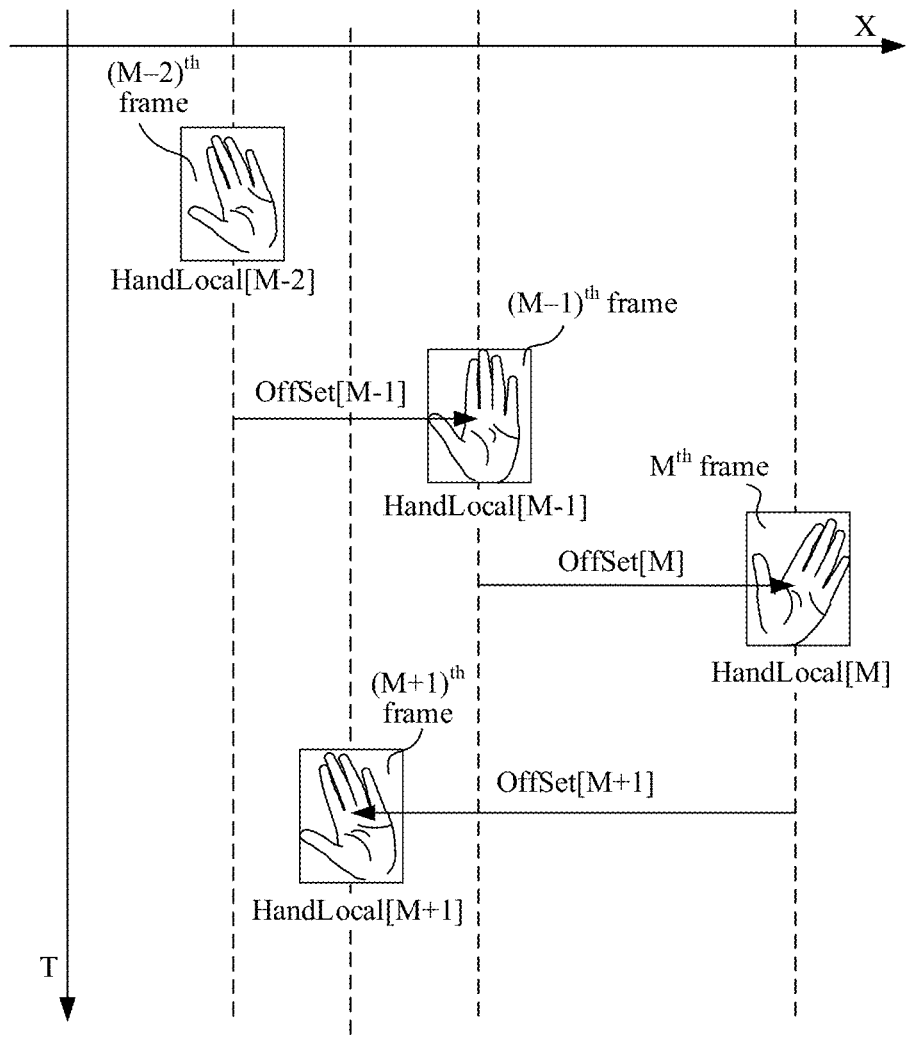
FIG. 8A is a schematic diagram for recognizing a waving gesture by an electronic device according to an embodiment of this application.

For a specific process of recognizing the waving gesture of the user by the electronic device 100 in the implementation process of recognizing the waving gesture and sliding gesture by using moving directions as shown in FIG. 7, refer to FIG. 8A.

Assumption: In FIG. 6A, the image frame S1 corresponds to the (M−2)$^{th}$ frame of image, the image frame S2 corresponds to the (M−1)$^{th}$ frame of image, the image frame S3 corresponds to the M$^{th}$ frame of image, and the image frame S4 corresponds to the (M+1)$^{th}$ frame of image. S4 is the last frame of image in the original image sequence whose frame quantity is Q, that is, the (M+1)$^{th}$ frame of image is the last frame of image. In the image frames S1, S2, S3, and S4, the user's hand is in horizontal positions X(S1), X(S2), X(S3), and X(S4) in the image frames, that is, HandLocal[M−2], HandLocal[M−1], HandLocal[M], and HandLocal[M+1].

By performing step S701, the electronic device 100 can obtain the (M−1)$^{th}$ frame of image and the M$^{th}$ frame of image, and determine the user's hand positions HandLocal[M−1] and HandLocal[M] in the two frames of images.

By performing step S702, the electronic device 100 can determine the position offset OffSet[M] between the user's hand positions in the (M−1)$^{th}$ frame of image and the M$^{th}$ frame of image by using HandLocal[M−1] and HandLocal[M] in the image frames.

By performing step S703, the electronic device 100 can determine the product of OffSet[M] and OffSet[M−1]: OffSet[M]*OffSet[M−1], where OffSet[M−1] is calculated by the electronic device 100 by using HandLocal[M−2] and HandLocal[M−1] according to step S702.

As shown in FIG. 8A, the direction of OffSet[M] is the same as the positive direction of the x-axis, that is, OffSet[M]≥0. Likewise, OffSet[M−1]≥0. Therefore, OffSet[M] *OffSet[M−1]≥0 is true.

In this case, the electronic device 100 may increase the value of M and re-perform step S701. Assuming that the method of increasing the value of M is M=M+1, when re-performing S701, the electronic device 100 can obtain the M$^{th}$ frame of image and the (M+1)$^{th}$ frame of image, and determine the user's hand positions HandLocal[M] and HandLocal[M+1] in the two frames of images.

Then by performing step S702, the electronic device 100 can determine the position offset OffSet[M+1] between the user's hand positions in the M$^{th}$ frame of image and the (M+1)$^{th}$ frame of image by using HandLocal[M] and HandLocal[M+1] in the image frames.

By performing step S703, the electronic device 100 can determine a product of OffSet[M+1] and OffSet[M]: OffSet [M+1]*OffSet[M], where OffSet[M] has been determined in the previous cycle.

As shown in FIG. 8A, in this case, a direction of OffSet [M+1] is opposite to the positive direction of the x-axis, that is, OffSet[M+1]<0, but the direction of OffSet[M] is the same as the positive direction of the x-axis, that is, OffSet [M]≥0. In this case, OffSet[M+1]*OffSet[M]<0 is true. This means that moving directions of two movements of the user's hand, formed by the (M−1)$^{th}$ frame of image, the M$^{th}$ frame of image, and the (M+1)$^{th}$ frame of image are different, that is, the moving direction has changed. Therefore, the electronic device 100 can recognize that the user performs a waving gesture.

Figure 8B:
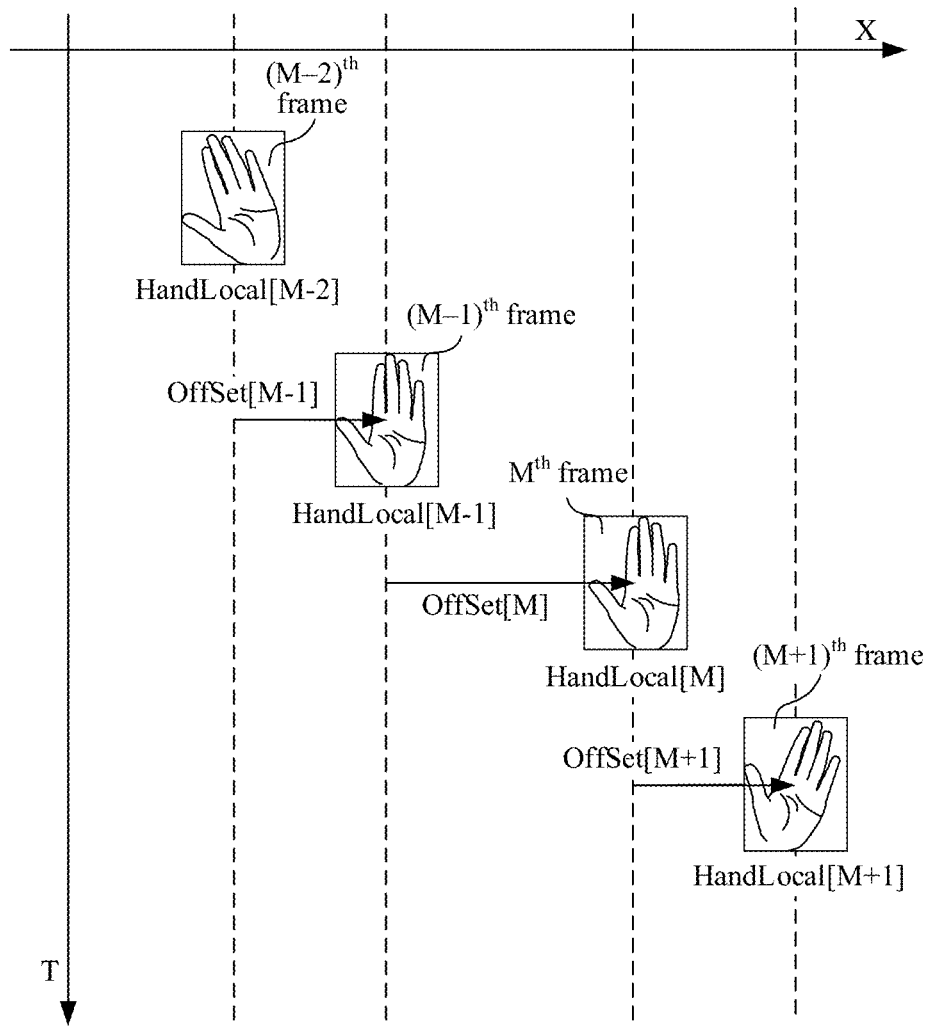
FIG. 8B is a schematic diagram for recognizing a right-sliding gesture by an electronic device according to an embodiment of this application.

For a specific process of recognizing the waving gesture of the user by the electronic device 100 in the implementation process of recognizing the waving gesture and sliding gesture by using moving directions as shown in FIG. 7, refer to FIG. 8B.

Assumption: In FIG. 6B, the image frame T1 corresponds to the (M−2)$^{th}$ frame of image, the image frame T2 corresponds to the (M−1)$^{th}$ frame of image, the image frame T3 corresponds to the M$^{th}$ frame of image, and the image frame T4 corresponds to the (M+1)$^{th}$ frame of image. T4 is the last frame of image in the original image sequence whose frame quantity is Q, that is, the (M+1)$^{th}$ frame of image is the last frame of image. In the image frames T1, T2, T3, and T4, the user's hand is in horizontal positions X(T1), X(T2), X(T3), and X(T4) in the image frames, that is, HandLocal[M−2], HandLocal[M−1], HandLocal[M], and HandLocal[M+1].

By performing step S701, the electronic device 100 can obtain the (M−1)$^{th}$ frame of image and the M$^{th}$ frame of image, and determine the user's hand positions HandLocal [M−1] and HandLocal[M] in the two frames of images.

By performing step S702, the electronic device 100 can determine the position offset OffSet[M] between the user's hand positions in the (M−1)$^{th}$ frame of image and the M$^{th}$ frame of image by using HandLocal[M−1] and HandLocal [M] in the image frames.

By performing step S703, the electronic device 100 can determine the product of OffSet[M] and OffSet[M−1]: OffSet[M]*OffSet[M−1], where OffSet[M−1] is calculated by the electronic device 100 by using HandLocal[M−2] and HandLocal[M−1] according to step S702.

As shown in FIG. 8B, the direction of OffSet[M] is the same as the positive direction of the x-axis, that is, OffSet [M]>0. Likewise, OffSet[M−1]>0. Therefore, OffSet[M] *OffSet[M−1]≥0 is true.

In this case, the electronic device 100 may increase the value of M and re-perform step S701. Likewise, assuming that the method of increasing the value of M is M=M+1, when re-performing S701, the electronic device 100 can obtain the M$^{th}$ frame of image and the (M+1)$^{th}$ frame of image, and determine the user's hand positions HandLocal [M] and HandLocal[M+1] in the two frames of images.

By performing step S703, the electronic device 100 can determine a product of OffSet[M+1] and OffSet[M]: OffSet [M+1]*OffSet[M], where OffSet[M] has been determined in the previous cycle.

As shown in FIG. 8B, the direction of OffSet[M+1] is the same as the positive direction of the x-axis, that is, OffSet [M+1]>0, and the direction of OffSet[M] is also the same as the positive direction of the x-axis, that is, OffSet[M]>0. In this case, OffSet[M+1]*OffSet[M]≥0 is still true. However, in this case, the (M+1)$^{th}$ frame is the last of image (M+1=Q) in the original image sequence, that is, M+1<Q is false.

When M+1<Q is false, by performing step S706, the electronic device 100 can determine that OffSet[M+1]>0 is true. In the scenario shown in FIG. 8B, when OffSet[M+1] >0 is true, the electronic device 100 can determine that the user performs a right-sliding gesture.

However, in the process of completing the left-sliding or right-sliding gesture, the user often ends up withdrawing and dropping the hand. In this case, the moving direction of the hand in the left-sliding or right-sliding gesture in last few frames of the original image sequence may be opposite to that in the previous moving state. Therefore, when performing the method for recognizing the waving gesture and sliding gesture by using the moving directions as shown in FIG. 7, the electronic device 100 is unable to recognize an opposite direction of moving caused by naturally withdrawing or dropping an arm by the user, but further recognizes the left-sliding or right-sliding gesture as a waving gesture.

Figure 9:
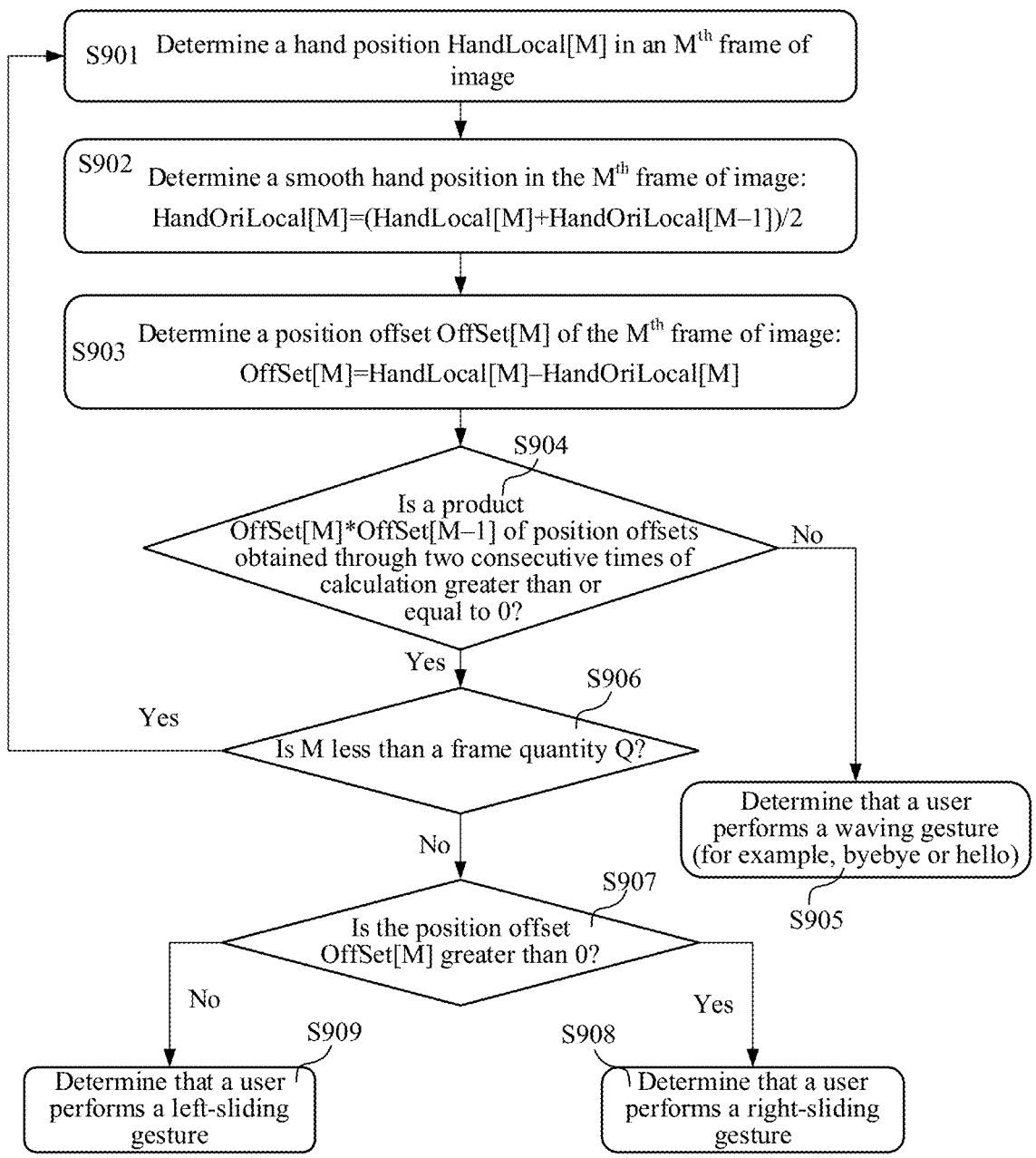
FIG. 9 is another flowchart for recognizing a waving gesture or a sliding (left-sliding or right-sliding) gesture by an electronic device according to an embodiment of this application.

Based on the foregoing problem, further, FIG. 9 is another flowchart of a method for recognizing a waving gesture and a sliding gesture by using moving directions. In comparison with the method shown in FIG. 7, a smooth hand position in an image frame is added in the method shown in FIG. 9, and the position is denoted as HandOriLocal. Different from the hand position HandLocal in the image described above, the smooth position HandOriLocal is an intermediate result of calculation and does not indicate specific image content. For details, refer to the subsequent description.

S901. Determine a hand position HandLocal[M] in an M$^{th}$ frame of image.

Herein, it is still assumed that a quantity of image frames in an original image sequence is Q=30. An electronic device 100 can obtain the M$^{th}$ frame of image from the original image sequence whose frame quantity is Q, where M is a positive integer of 2 Q. The electronic device 100 can determine the hand position HandLocal[M] in the M$^{th}$ frame of image.

For the method for determining the hand position HandLocal[M] in the M$^{th}$ frame of image, refer to the descriptions of FIG. 6A and FIG. 6B. Details are not described herein again.

S902. Determine a smooth hand position HandOriLocal [M] in the M$^{th}$ frame of image.

A smooth hand position in a video frame is a weighted average value of a hand position HandLocal in the video frame and a smooth hand position in a previous image frame. Therefore, the smooth hand position HandOriLocal [M] in the M$^{th}$ frame of image can be expressed as:

$$HandOriLocal[M] = (W_1 * HandLocal[M] + W_2 * HandOriLocal[M-1])/(W_1 + W_2).$$

W1 and W2 may respectively indicate weights of HandLocal and HandOriLocal. Preferably, W1=1 and W2=1, that is, HandOriLocal[M] is an average value of HandLocal[M] and HandOriLocal[M−1]. In the subsequent embodiment, W1=1 and W2=1 are used as examples for description.

When M=1, a smooth hand position in a first frame of image is HandOriLocal[1]=HandLocal[1]. Subsequently, using M=2 as an example, a smooth hand position in a second frame of image is HandOriLocal[2]=(HandLocal [2]+HandOriLocal[1])/2.

S903. Determine a position offset OffSet[M] of the M$^{th}$ frame of image.

After determining the hand position HandLocal[M] and the smooth hand position HandOriLocal[M] in the M$^{th}$ frame of image, the electronic device 100 can determine the position offset OffSet[M] of the M$^{th}$ frame of image by using the HandLocal[M] and HandOriLocal[M]:

$$OffSet[M] = HandLocal[M] - HandOriLocal[M].$$

Herein, a position offset actually indicated by the position offset OffSet[M] is a position offset between the hand position in the M$^{th}$ frame of image and the smooth hand position in the M$^{th}$ frame of image. The smooth position in the M$^{th}$ frame of image is obtained by using the hand position in the M$^{th}$ frame of image and a smooth hand position in an (M−1)$^{th}$ frame of image.

S904. Calculate a product of two adjacent position offsets and determine whether the product is greater than or equal to 0.

After determining the position offset OffSet[M] of the M$^{th}$ frame of image, the electronic device 100 can determine a product of OffSet[M] and OffSet[M−1], that is, OffSet[M] *OffSet[M−1], and determine whether the product is greater than or equal to 0.

The OffSet[M−1] is a position offset of the (M−1)$^{th}$ frame of image. The OffSet[M−1] can be obtained by using a hand position in the (M−1)$^{th}$ frame of image and the smooth hand position in the (M−1)$^{th}$ frame of image. The smooth hand position in the (M−1)$^{th}$ frame of image can be obtained by using the hand position in the (M−1)$^{th}$ frame of image and a smooth hand position in an (M−2)$^{th}$ frame of image. Details are not described herein again.

Subsequently, as in the method shown in FIG. 7, OffSet [M]*OffSet[M−1]≥0 may indicate that a moving direction of a hand in the (M−2)$^{th}$ frame and the (M−1)$^{th}$ frame is the same as a moving direction of the hand in the (M−1)$^{th}$ frame and the M$^{th}$ frame. OffSet[M]*OffSet[M−1]<0 may indicate that the moving direction of the hand in the (M−2)$^{th}$ frame and the (M−1)$^{th}$ frame is different from the moving direction of the hand in the (M−1)$^{th}$ frame and the M$^{th}$ frame, that is, a moving track of the hand in the (M−2)$^{th}$ frame of image to the M$^{th}$ frame of image shows a reciprocal left-right moving state.

S905. If OffSet[M]*OffSet[M−1]≥0 is false, the electronic device 100 can determine that a user performs a waving gesture.

S906. If OffSet[M]*OffSet[M−1]≥0 is true, the electronic device 100 can further determine whether M is less than the frame quantity Q.

If M<Q is true, the electronic device 100 is currently unable to determine the gesture of the user, and further needs to recognize image frames subsequent to the M$^{th}$ frame of image to confirm whether the reciprocal left-right moving state occurs in the subsequent images.

Therefore, the electronic device 100 can increase a value of M, and repeat steps S901 to S904 to determine position offsets between image frames after the $M^{th}$ frame of image and a product of the position offsets and determine whether the reciprocal left-right moving state occurs in the user's hand movement in the image frames after the $M^{th}$ frame of image.

If M<Q is false, that is, if the $M^{th}$ frame of image is a last frame of image, the electronic device 100 can determine that the reciprocal left-right moving state does not exist in the original image sequence. Further, the electronic device 100 can determine that the gesture performed by the user is a sliding gesture.

S907. Confirm whether the position offset OffSet[M] is greater than 0.

S908. If OffSet[M]>0 is true, the electronic device 100 can determine that the sliding gesture performed by the user is specifically a right-sliding gesture.

S909. If OffSet[M]>0 is false, the electronic device 100 can determine that the sliding gesture performed by the user is specifically a left-sliding gesture.

For detailed descriptions of S905 to S909, refer to S704 to S708 in FIG. 7. Details are not described herein again.

Figure 10A:
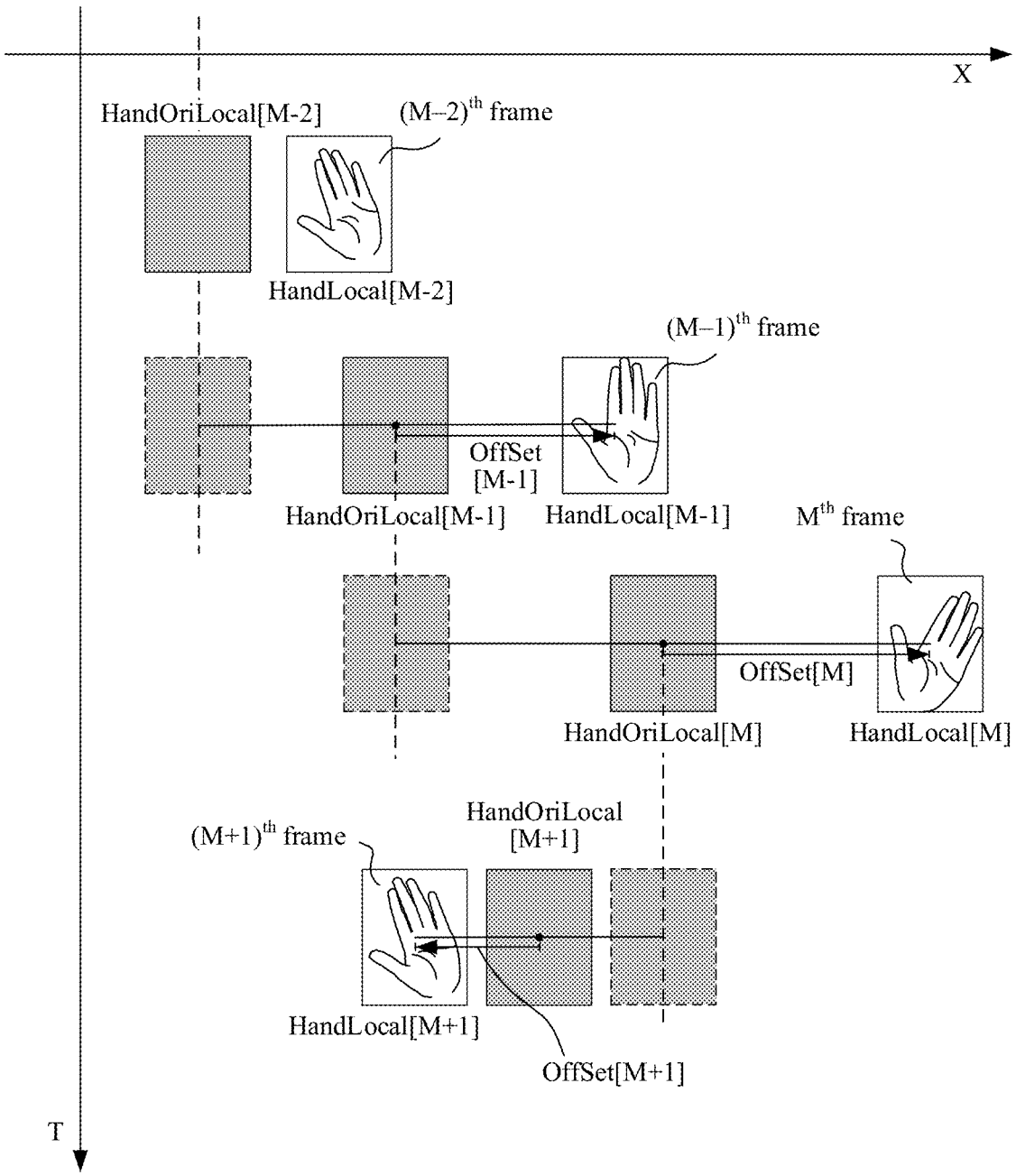
FIG. 10A is a schematic diagram for recognizing a waving gesture by an electronic device according to an embodiment of this application.

For a specific process of recognizing the waving gesture of the user by the electronic device 100 in the implementation process of recognizing the waving gesture and sliding gesture by using moving directions as shown in FIG. 9, refer to FIG. 10A.

Same assumption: In FIG. 6A, the image frame S1 corresponds to the $(M-2)^{th}$ frame of image, the image frame S2 corresponds to the $(M-1)^{th}$ frame of image, the image frame S3 corresponds to the $M^{th}$ frame of image, and the image frame S4 corresponds to the $(M+1)^{th}$ frame of image. S4 is the last frame of image in the original image sequence whose frame quantity is Q, that is, the $(M+1)^{th}$ frame of image is the last frame of image. In the image frames S1, S2, S3, and S4, the user's hand is in horizontal positions X(S1), X(S2), X(S3), and X(S4) in the image frames, that is, HandLocal[M−2], HandLocal[M−1], HandLocal[M], and HandLocal[M+1].

As shown in FIG. 10A, a position of a white rectangular box on an x-axis may indicate a horizontal position of the user's hand in the image frame. Therefore, the position of the white rectangular box on the x-axis may be denoted as HandLocal. In FIG. 10A, a position of a grey rectangular box at a same time (that is, with a same value on a t-axis) as the white rectangular box is a smooth position corresponding to the white rectangular box. The position of the grey rectangular box on the x-axis may be denoted as HandOriLocal. The smooth position is obtained through calculation by using a horizontal position of a hand image in a current image frame and a smooth position of the hand image in a previous image frame. Details are described in the subsequent embodiment and not described herein.

By performing step S901, the electronic device 100 can obtain the $M^{th}$ frame of image and determine the hand position HandLocal[M] in the $M^{th}$ frame of image.

By performing step S902, the electronic device 100 can determine the smooth hand position HandOriLocal[M] in the $M^{th}$ frame by using HandLocal[M] and HandOriLocal[M−1]:

$$HandOriLocal[M] = (HandLocal[M] + HandOriLocal[M-1])/2,$$

where $HandOriLocal[M-1] =$ $$(HandLocal[M-1] + HandOriLocal[M-2])/2.$$

Figure 10B:
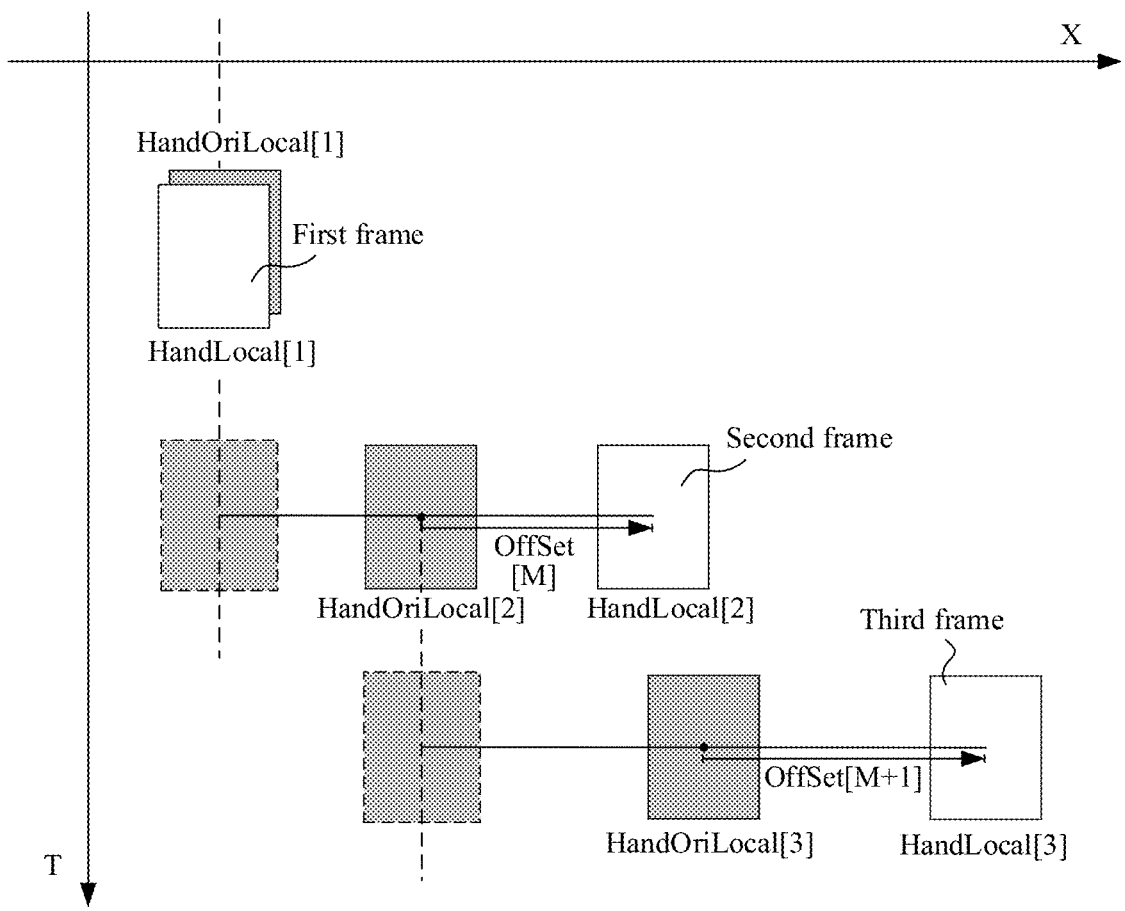
FIG. 10B is a schematic diagram for calculating a smooth position in a first frame of image by an electronic device according to an embodiment of this application.

In particular, when M=1, HandOriLocal[1]=HandLocal[M]. Referring to FIG. 10B, when M=1, the $M^{th}$ frame of image is the first frame of image. Therefore, the smooth hand position in the $M^{th}$ frame of image is the horizontal position of the hand in the $M^{th}$ frame of image. Subsequently, when M=2, HandOriLocal[2]=(HandLocal[2]+HandOriLocal[1])/2; and when M=3, HandOriLocal[3]=(HandLocal[3]+HandOriLocal[2])/2, and so on, until the last frame of image.

Referring back to FIG. 10A, after the electronic device 100 determines the horizontal position HandLocal[M] of the hand in the $M^{th}$ frame of image, the electronic device 100 can obtain HandOriLocal[M−1]. The HandOriLocal[M−1] is calculated by the electronic device 100 by using HandLocal[M−1] and HandOriLocal[M−2] according to step S902.

Therefore, by performing HandOriLocal[M]=(HandLocal[M]+HandOriLocal[M−1])/2, the electronic device 100 can obtain the smooth hand position HandOriLocal[M] in the $M^{th}$ frame of image.

Then by performing step S903 OffSet[M]=HandLocal[M]-HandOriLocal[M], the electronic device 100 can obtain the position offset OffSet[M] of the $M^{th}$ frame of image. As shown in FIG. 10A, in this case, a direction of OffSet[M] is the same as a positive direction of the x-axis, that is, OffSet[M]≥0.

In addition, the electronic device 100 can determine the position offset OffSet[M−1] of the $(M-1)^{th}$ frame of image. The OffSet[M−1] may be obtained through calculation by using HandLocal[M−1] and HandOriLocal[M−2]. For a specific process of calculating the OffSet[M−1], refer to the foregoing method for calculating the OffSet[M]. Details are not described herein again. As shown in FIG. 10A, in this case, a direction of OffSet[M−1] is the same as the positive direction of the x-axis, that is, OffSet[M−1]≥0.

Therefore, OffSet[M]*OffSet[M−1]≥0 is true.

In this case, the electronic device 100 may increase the value of M and re-perform step S901. Likewise, assuming that the method of increasing the value of M is M=M+1, when re-performing S901, the electronic device 100 can obtain the $(M+1)^{th}$ frame of image, and determine the hand position HandLocal[M+1] in the $(M+1)^{th}$ frame of image.

By re-performing step S902, the electronic device 100 can determine the smooth hand position HandOriLocal[M+1] in the $(M+1)^{th}$ frame of image by using HandLocal[M+1] and HandOriLocal[M]:

$$HandOriLocal[M+1] = (HandLocal[M+1] + HandOriLocal[M])/2,$$

where HandOriLocal[M] has been determined in the previous cycle.

Then by re-performing step S903, the electronic device 100 can obtain the position offset OffSet[M+1] of the $(M+1)^{th}$ frame of image by using HandLocal[M+1] and HandOriLocal[M+1]:

$$OffSet[M+1] = HandLocal[M+1] - HandOriLocal[M+1].$$

As shown in FIG. 10A, in this case, a direction of OffSet[M+1] is opposite to the positive direction of the x-axis. In this case, OffSet[M]<0. However, in the previous cycle, OffSet[M]>0. Therefore, OffSet[M+1]*OffSet[M]≥0 is false. This means that moving directions of two movements of the user's hand, formed by the $(M-1)^{th}$ frame of image, the $M^{th}$ frame of image, and the $(M+1)^{th}$ frame of image are different, that is, the moving direction has changed. Therefore, the electronic device 100 can recognize that the user performs a waving gesture.

Figure 10C:
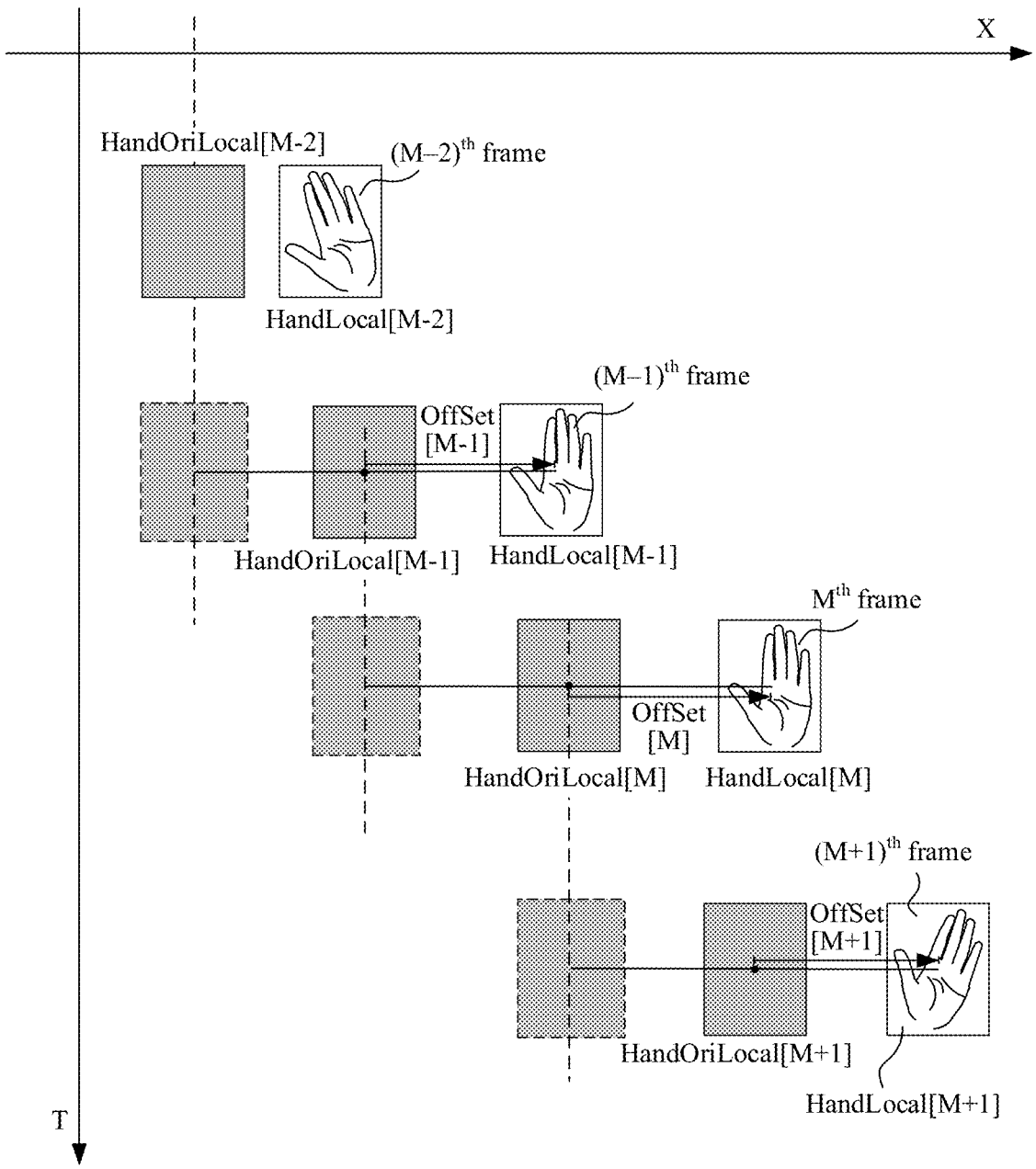
FIG. 10C is a schematic diagram for recognizing a right-sliding gesture by an electronic device according to an embodiment of this application.

For a specific process of recognizing the sliding gesture of the user by the electronic device 100 in the implementation process of recognizing the waving gesture and sliding gesture by using moving directions as shown in FIG. 9, refer to FIG. 10C.

Likewise, in FIG. 6B, the image frame T1 corresponds to the $(M-2)^{th}$ frame of image, the image frame T2 corresponds to the $(M-1)^{th}$ frame of image, the image frame T3 corresponds to the $M^{th}$ frame of image, and the image frame T4 corresponds to the $(M+1)^{th}$ frame of image. T4 is the last frame of image in the original image sequence whose frame quantity is Q, that is, the $(M+1)^{th}$ frame of image is the last frame of image. In the image frames T1, T2, T3, and T4, the user's hand is in horizontal positions X(T1), X(T2), X(T3), and X(T4) in the image frames, that is, HandLocal[M−2], HandLocal[M−1], HandLocal[M], and HandLocal[M+1].

By performing step S901, the electronic device 100 can obtain the $M^{th}$ frame of image and determine the hand position HandLocal[M] in the $M^{th}$ frame of image.

By performing step S902, the electronic device 100 can determine the smooth hand position HandOriLocal[M] in the $M^{th}$ frame by using HandLocal[M] and HandOriLocal[M−1]:

$$HandOriLocal[M] = (HandLocal[M] + HandOriLocal[M-1])/2.$$

The HandOriLocal[M−1] is calculated by the electronic device 100 by using HandLocal[M−1] and HandOriLocal[M−2] according to step S902. Details are not described herein again.

Then by performing step S903, the electronic device 100 can obtain the position offset OffSet[M] of the $M^{th}$ frame of image.

$$OffSet[M] = HandLocal[M] - HandOriLocal[M].$$

As shown in FIG. 10C, in this case, the direction of OffSet[M] is the same as the positive direction of the x-axis, that is, OffSet[M]>0.

In addition, the electronic device 100 can determine the position offset OffSet[M−1] of the $(M-1)^{th}$ frame of image. The OffSet[M−1] may be obtained through calculation by using HandLocal[M−1] and HandOriLocal[M−2]. For a specific process of calculating the OffSet[M−1], refer to the foregoing method for calculating the OffSet[M]. Details are not described herein again. As shown in FIG. 10A, in this case, the direction of OffSet[M−1] is the same as the positive direction of the x-axis, that is, OffSet[M−1]>0.

Therefore, OffSet[M]*OffSet[M−1]≥0 is true.

In this case, the electronic device 100 may increase the value of M and re-perform step S901. Likewise, assuming that the method of increasing the value of M is M=M+1, when re-performing S901, the electronic device 100 can obtain the $(M+1)^{th}$ frame of image, and determine the hand position HandLocal[M+1] in the $(M+1)^{th}$ frame of image.

By re-performing step S902, the electronic device 100 can determine the smooth hand position HandOriLocal[M+1] in the $(M+1)^{th}$ frame of image by using HandLocal[M+1] and HandOriLocal[M]:

$$HandOriLocal[M + 1] = (HandLocal[M + 1] + HandOriLocal[M])/2.$$

where HandOriLocal[M] has been determined in the previous cycle.

Then by re-performing step S903, the electronic device 100 can obtain the position offset OffSet[M+1] of the $(M+1)^{th}$ frame of image by using HandLocal[M+1] and HandOriLocal[M+1]:

$$OffSet[M + 1] = HandLocal[M + 1] - HandOriLocal[M + 1].$$

As shown in FIG. 10C, in this case, the direction of OffSet[M+1] is still the same as the positive direction of the x-axis. In this case, OffSet[M]>0. With reference to OffSet [M]>0 determined in the previous cycle, OffSet[M+1]*OffSet[M]≥0 is still true. However, the $(M+1)^{th}$ frame is the last of image in the original image sequence, that is, M+1=Q. Therefore, M+1<Q is false. In this case, the electronic device 100 can determine that the gesture performed by the user is a sliding gesture.

Further, by performing steps S907 to S909, the electronic device 100 can further determine that the sliding gesture is specifically a left-sliding gesture or a right-sliding gesture. In the scenario shown in FIG. 10C, when OffSet[M+1]>0, the electronic device 100 can determine that the user performs a right-sliding gesture.

When implementing the method for recognizing the waving gesture and sliding gesture by using the moving directions as shown in FIG. 9, the electronic device 100 can avoid an opposite direction of moving caused by naturally withdrawing or dropping an arm by the user, and further avoid recognizing the left-sliding or right-sliding gesture as a waving gesture, so that accuracy of gesture recognition is improved.

Figure 10D:
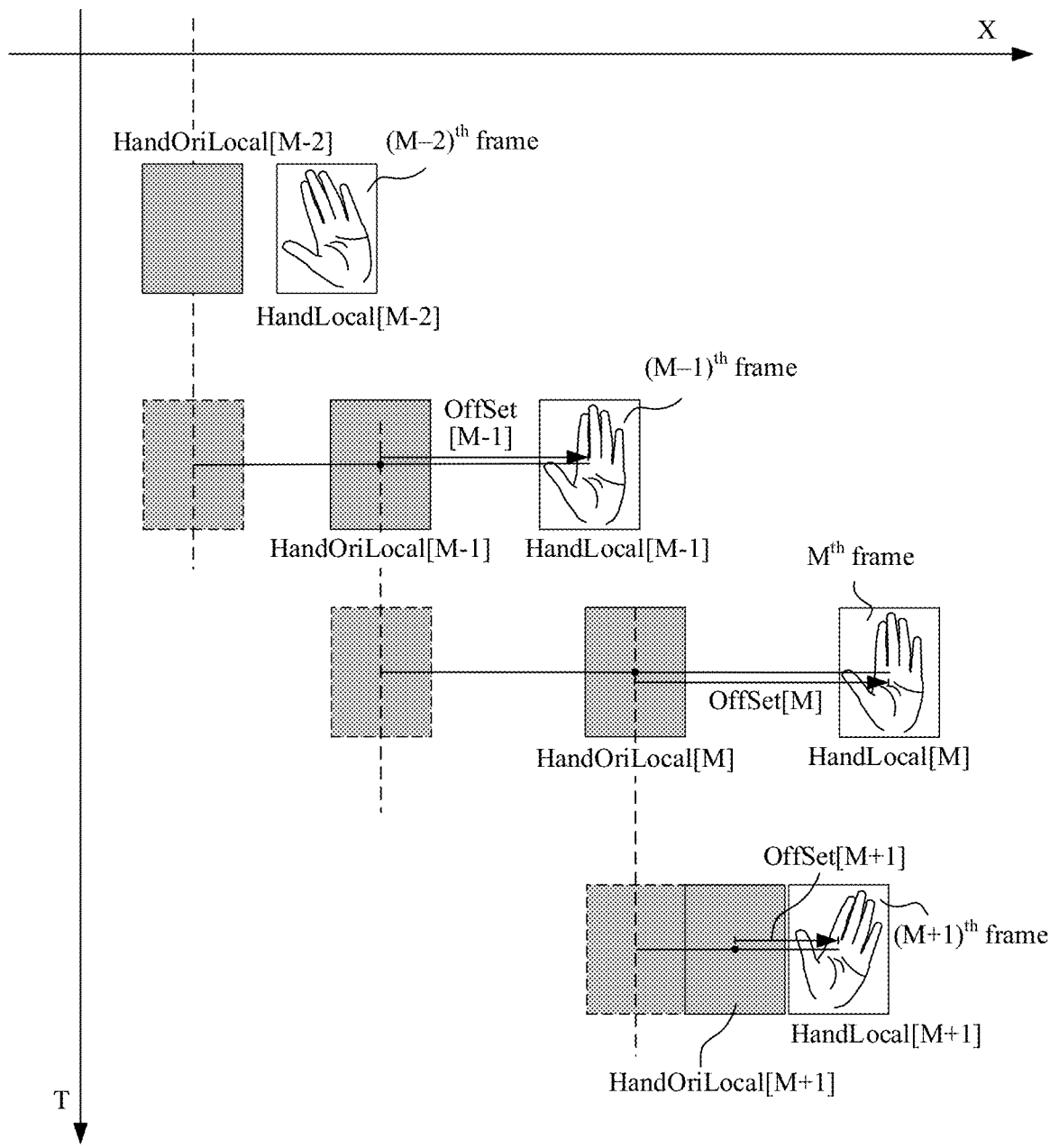
FIG. 10D is a schematic diagram for recognizing a right-sliding gesture by an electronic device according to an embodiment of this application.

Specifically, FIG. 10D is a schematic diagram showing that the electronic device 100 avoids the opposite direction of moving caused by naturally withdrawing or dropping the arm by the user.

As shown in FIG. 10D, the $(M-2)^{th}$ frame of image, the $(M-1)^{th}$ frame of image, the $M^{th}$ frame of image, and the $(M+1)^{th}$ frame of image are a group of image frames in which the user performs a right-sliding gesture. In this case, because the user naturally withdraws or drops the arm, the horizontal position of the user's hand in the last frame of image (the $(M+1)^{th}$ frame of image) falls back in comparison with the horizontal position of the user's hand in the $M^{th}$ frame of image.

If the method shown in FIG. 7 is followed, the position offset OffSet[M] between the $(M-1)^{th}$ frame of image and the $M^{th}$ frame of image is greater than 0, but the position offset OffSet[M+1] between the $M^{th}$ frame of image and the $(M+1)^{th}$ frame of image is less than 0. Therefore, OffSet [M+1]*OffSet[M]≥0 is false. Further, the electronic device 100 recognizes that the gesture shown in FIG. 10D is a waving gesture.

If the method shown in FIG. 9 is followed, the smooth hand position HandOriLocal[M+1] in the $(M+1)^{th}$ frame of image is obtained by using HandLocal[M+1] and HandOriLocal[M].

As shown in FIG. 10D, in this case, the smooth hand position HandOriLocal[M+1] in the $(M+1)^{th}$ frame of image still precedes HandLocal[M+1], that is, HandOriLocal[M+1]≤HandLocal[M+1].

Therefore, OffSet[M+1]>0. Further, OffSet[M+1]*OffSet[M]≥0 is still true.

In this case, the electronic device 100 can recognize that the gesture shown in FIG. 10D is a sliding gesture. Further, based on OffSet[M+1]>0 or OffSet[M+1]<0, the electronic device 100 can determine that the sliding gesture is specifically a right-sliding gesture or a left-siding gesture. Details are not described herein again.

In the embodiments of this application, the user interface shown in FIG. 2A may be referred to as a first interface; the preview window 101 in FIG. 2A may be referred to as a first preview window; the preview window 102 in FIG. 2A may be referred to as a second preview window; the left-sliding gesture performed by the user in FIG. 2A may be referred to as a first gesture; the user interface shown in FIG. 2B may be referred to as a third interface; and the preview window 102 in FIG. 2B may be referred to as a third preview window.

In FIG. 6A, S2 may be referred to as a first image, S3 may be referred to as a third image, and S4 may be referred to as a second image; and an image region (image region covered by a dashed box) in which the hand is located in S2, S3, or S4 may be referred to as a hand image. Alternatively, in FIG. 6B, H2 may be referred to as a first image, H3 may be referred to as a third image, H4 may be referred to as a second image, and so on.

Assuming that H2, H3, and H4 are respectively the first image, the third image, and the second image, with reference to FIG. 8B, a coordinate HandLocal[M−1] of the hand image in H2 (the $(M−1)^{th}$ frame of image) on the x-axis may be referred to as a first position; a coordinate HandLocal[M] of the hand image in H3 (the $M^{th}$ frame of image) on the x-axis may be referred to as a third position; and a coordinate HandLocal[M+1] of the hand image in H4 (the $(M+1)^{th}$ frame of image) on the x-axis may be referred to as a second position.

The OffSet[M] determined by using HandLocal[M−1] and HandLocal[M] may be referred to as a first displacement vector. The direction of OffSet[M] may be referred to as first direction information. The OffSet[M+1] determined by using HandLocal[M] and HandLocal[M+1] may be referred to as a second displacement vector. The direction of OffSet[M+1] may be referred to as second direction information.

Assuming that H2, H3, and H4 are respectively the first image, the third image, and the second image, with reference to FIG. 10C, a coordinate HandLocal[M−1] of the hand image in H2 (the $(M−1)^{th}$ frame of image) on the x-axis may be referred to as a first position; and a coordinate HandLocal[M] of the hand image in H3 (the $M^{th}$ frame of image) on the x-axis may be referred to as a third position. HandOriLocal[M−1] corresponding to HandLocal[M−1] may be referred to as a fifth position. HandOriLocal[M] determined by using HandOriLocal[M−1] and HandLocal[M] may be referred to as a fourth position. The OffSet[M] determined by using HandOriLocal[M] and HandLocal[M] may be referred to as a first displacement vector.

The x-axis in FIG. 6A and FIG. 6B, FIG. 8A and FIG. 8B, and FIG. 10A to FIG. 10C may be referred to as a first coordinate axis. Referring to S1 in FIG. 6A, a central point of the hand image may be referred to as a characteristic point of the hand image.

The control 115 in FIG. 1A may be referred to as a first control.

Figure 11:
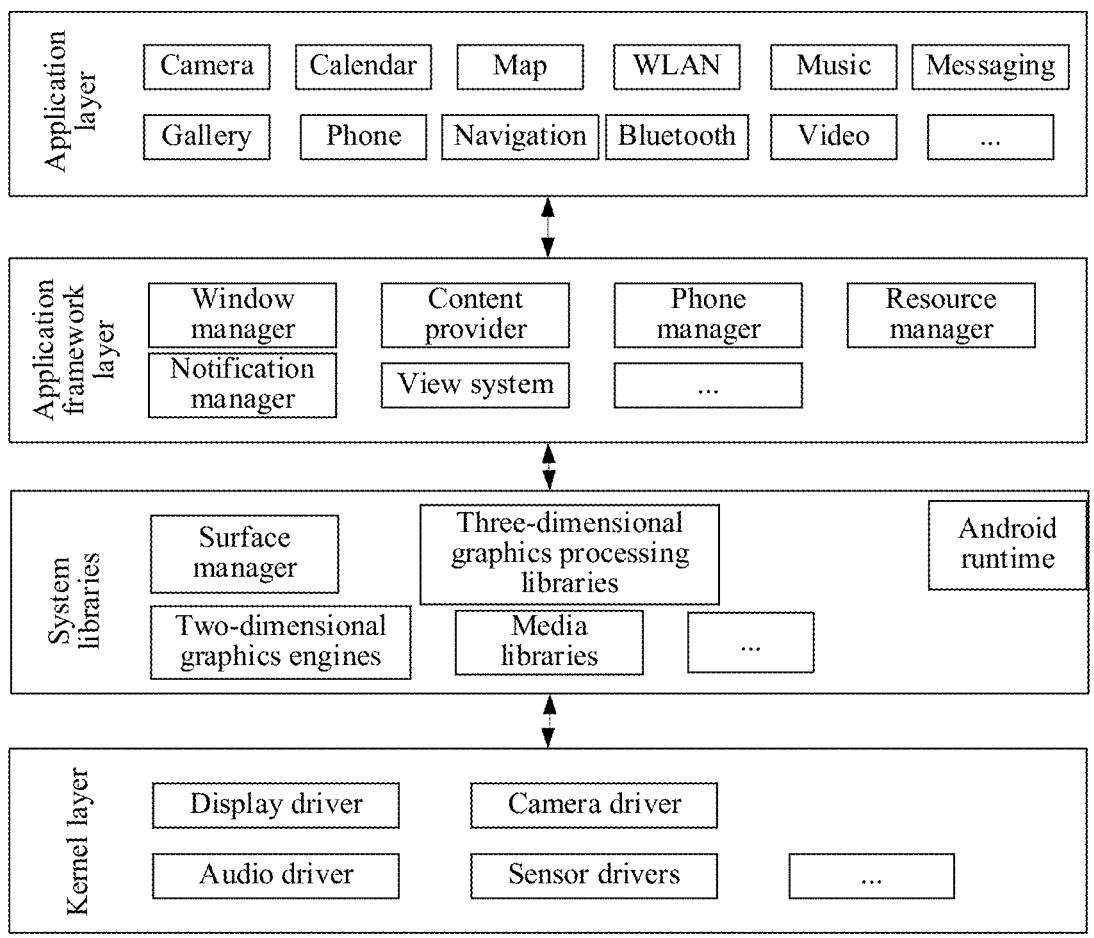
FIG. 11 is a software architecture diagram of an electronic device according to an embodiment of this application.

A software system of the electronic device 100 may use a hierarchical architecture, an event driven architecture, a microkernel architecture, a microservice architecture, or a cloud architecture. A software structure of the electronic device 100 is illustrated in this embodiment of the present invention by using a hierarchical Android system as an example. FIG. 11 illustrates a software architecture of the electronic device 100.

In the hierarchical architecture, software is divided into several layers, each with a clear role and division of labor. Communication is performed between the layers through a software interface. In some embodiments, the Android system is divided into four layers from top to bottom: an application layer, an application framework layer, Android runtime (Android runtime) and system libraries, and a kernel layer.

The application layer may include a series of application program packages. As shown in FIG. 11, the application program packages may include application programs such as camera, gallery, calendar, phone, map, navigation, WLAN, Bluetooth, music, video, and messaging.

A method for recognizing a waving or sliding gesture of a user by using a moving track according to an embodiment of this application may be implemented in a camera application. The user interfaces shown in FIG. 1A and FIG. 1B, FIG. 2A to FIG. 2I, FIG. 3A to FIG. 3F, FIG. 4A to FIG. 4D, and FIG. 5A and FIG. 5B may be application interfaces provided by the camera application.

The application framework layer provides an application programming interface (application programming interface, API) and a programming framework for application programs at the application layer. The application framework layer includes some predefined functions. As shown in FIG. 11, the application framework layer includes a window manager, a content provider, a view system, a phone manager, a resource manager, a notification manager, and the like.

The window manager is configured to manage a window program. The window manager may obtain a display size, determine whether there is a status bar, lock a screen, capture a screen, and the like. Depending on the window manager, the electronic device 100 displays the user interfaces shown in FIG. 1A and FIG. 1B, FIG. 2A to FIG. 2I, FIG. 3A to FIG. 3F, FIG. 4A to FIG. 4D, and FIG. 5A and FIG. 5B in the embodiments of this application.

The content provider is configured to store and obtain data, and make the data accessible to an application program. In the embodiments of this application, data generated by the camera after capture such as video data and audio data may be buffered in the content provider.

The view system includes visual controls, for example, a text display control and a picture display control. The view system may be configured to construct application programs. A display interface may include one or more views. In the embodiments of this application, the view system may include various controls in the user interfaces shown in FIG. 1A and FIG. 1B, FIG. 2A to FIG. 2I, FIG. 3A to FIG. 3F, FIG. 4A to FIG. 4D, and FIG. 5A and FIG. 5B. The view system further records a layout of interface elements including the controls, graphics, and the like. By using the controls, graphic resources, and layout resources of the controls and graphics, the electronic device 100 can display the user interfaces shown in FIG. 1A and FIG. 1B, FIG. 2A to FIG. 2I, FIG. 3A to FIG. 3F, FIG. 4A to FIG. 4D, and FIG. 5A and FIG. 5B.

The resource manager provides, for an application program, various resources such as a localized character string, an icon, a picture, a layout file, and a video file. When running the camera application, the resource manager can provide a video, an audio, and a layout file of the camera application for the camera application.

The Android runtime includes a kernel library and a virtual machine. The Android runtime is responsible for scheduling and management of the Android system. The kernel library includes two parts. One part is a function to be invoked by a Java language, and the other part is an Android kernel library. The application layer and the application framework layer run in the virtual machine.

The system libraries may include a plurality of functional modules, for example, a surface manager (surface manager), media libraries (Media Libraries), a three-dimensional graphics processing libraries (for example, OpenGL ES), and 2D graphics engines (for example, SGL).

The surface manager is configured to manage a display subsystem and provide 2D-3D layer blending for a plurality of application programs. Depending on a 2D-3D layer blending capability provided by the surface manager, the electronic device 100 displays the user interfaces shown in FIG. 1A and FIG. 1B, FIG. 2A to FIG. 2I, FIG. 3A to FIG. 3F, FIG. 4A to FIG. 4D, and FIG. 5A and FIG. 5B.

The media libraries support playback and recording in a plurality of common audio and video formats, a still image file, and the like. The media libraries can support a plurality of audio and video encoding formats, such as MPEG4, H.264, MP3, AAC, AMR, JPG, and PNG. In the embodiments of this application, when shooting a video in a dual-view mode, the electronic device 100 can encode and save the video by using audio and video encoding capabilities provided by the media libraries.

The three-dimensional graphics processing libraries are configured to implement three-dimensional graphics drawing, image rendering, composing, layer processing, and the like. The 2D graphics engines are drawing engines for 2D drawing. Depending on drawing and rendering services provided by the three-dimensional graphics processing libraries and the 2D graphics engines, the electronic device 100 invokes framework layer interfaces such as the window manager and the view system to implement functions of displaying the user interfaces shown in FIG. 1A and FIG. 1B, FIG. 2A to FIG. 2I, and the like.

The kernel layer is a layer between hardware and software. The kernel layer includes at least a display driver, a camera driver, an audio driver, and a sensor driver.

The display driver can be used to drive the display to display the layout file of the camera application, videos, controls, and the like provided by the resource manager, to display the user interfaces of the camera application shown in FIG. 1A and FIG. 1B and FIG. 2A to FIG. 2I. The camera driver can be used to drive the camera to capture images and convert optical signals into electrical signals, thereby generating images and video streams.

Figure 12:
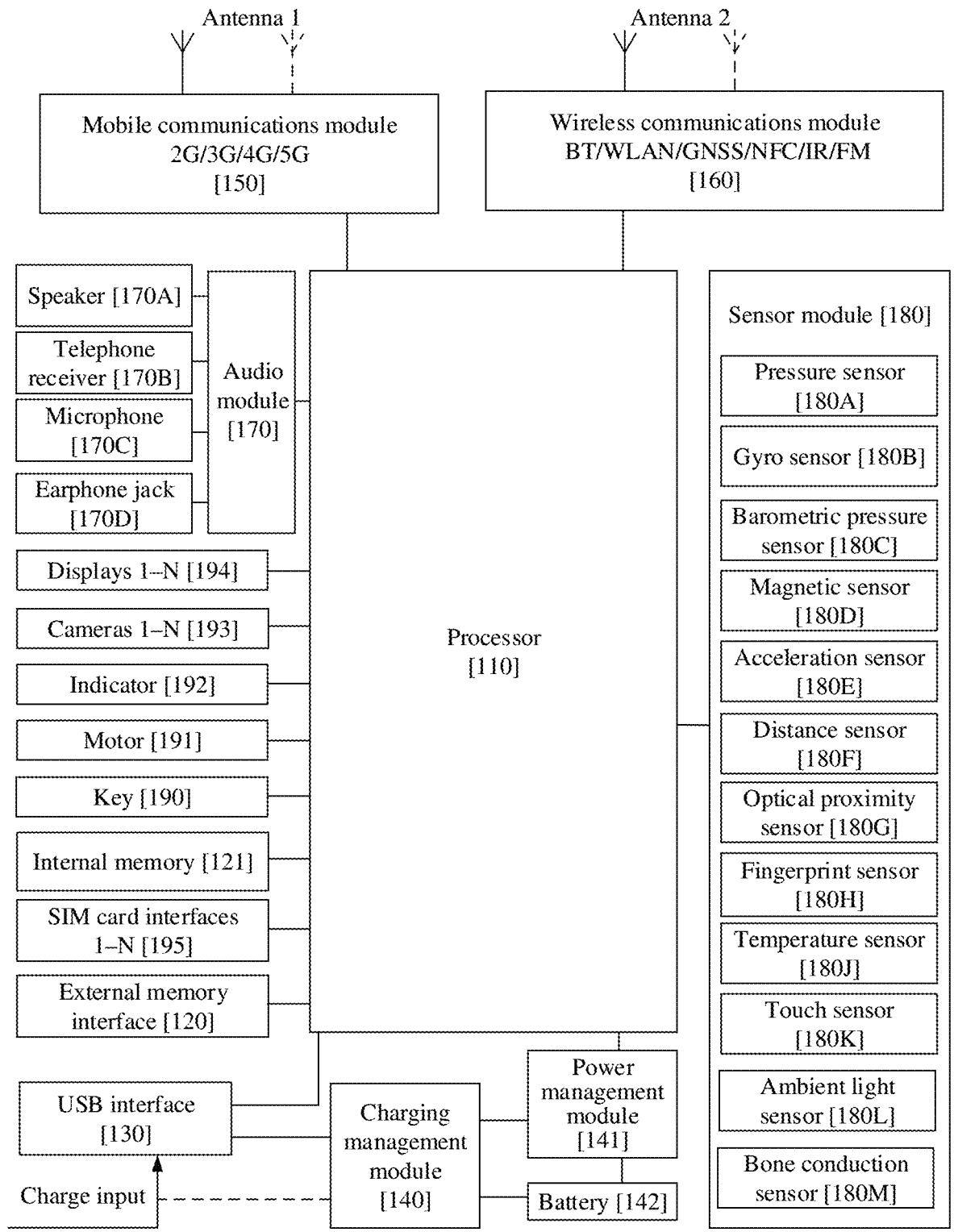
FIG. 12 is a hardware architecture diagram of an electronic device according to an embodiment of this application.

FIG. 12 illustrates a hardware architecture of the electronic device 100.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 193, a display 194, a subscriber identity module (subscriber identification module, SIM) interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in the embodiments of the present invention does not constitute a specific limitation on the electronic device 100. In other embodiments of this application, the electronic device 100 may include more or fewer components than those shown in the figure, or combine some components, or split some components, or have a different component arrangement. The illustrated components may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural network processing unit (neural-network processing unit, NPU). Different processing units may be independent components, or may be integrated into one or more processors.

The controller may generate an operation control signal based on instruction operation code and a timing signal, and implement control over instruction fetching and instruction execution.

A memory may be further disposed in the processor 110, and is configured to store an instruction and data. In some embodiments, the memory in the processor 110 is a cache memory. The memory may store an instruction or data that has just been used or cyclically used by the processor 110. If the processor 110 needs to use the instruction or data again, the processor 110 may invoke the instruction or data directly from the memory. Therefore, repeated access is avoided, a waiting time of the processor 110 is reduced, and efficiency of the system is improved.

It may be understood that an interface connection relationship, between the modules, illustrated in the embodiments of the present invention is merely an example for description, and does not constitute a limitation on a structure of the electronic device 100. In other embodiments of this application, the electronic device 100 may alternatively use an interface connection mode different from that in the foregoing embodiments, or a combination of a plurality of interface connection modes.

The electronic device 100 implements a display function by using the GPU, the display 194, the application processor, and the like. The GPU is a microprocessor used for image processing, and is connected to the display 194 and the application processor. The GPU is configured to perform mathematical and geometric computation for graphic rendering. The processor 110 may include one or more GPUs, and the GPU executes a program instruction to generate or change display information.

The display 194 is configured to display an image, a video, and the like. The display 194 includes a display panel. The display 194 includes a display panel. The display panel may be a liquid crystal display (liquid crystal display, LCD). Alternatively, the display panel may be made of an organic light-emitting diode (organic light-emitting diode, OLED), an active-matrix organic light emitting diode or an active-matrix organic light emitting diode (active-matrix organic light emitting diode, AMOLED), a flex light-emitting diode (flex light-emitting diode, FLED), a miniled, a microled, a micro-oled, a quantum dot light emitting diode (quantum dot light emitting diodes, QLED), or the like. In some embodiments, the electronic device may include one or N displays 194, where N is a positive integer greater than 1.

Depending on the GPU, the display 194, the application processor, and the like, the electronic device 100 displays the user interfaces shown in FIG. 1A and FIG. 1B, FIG. 2A to FIG. 2I, FIG. 3A to FIG. 3F, FIG. 4A to FIG. 4D, and FIG. 5A and FIG. 5B in the embodiments of this application.

The electronic device 100 may implement a shooting function by using the ISP, the camera 193, the video codec, the GPU, the display 194, the application processor, or the like.

The ISP is configured to process data fed back by the camera 193. For example, during photographing, a shutter is opened, light is transmitted to a photosensitive element of the camera through a lens, an optical signal is converted into an electrical signal, and the photosensitive element of the camera transmits the electrical signal to the ISP for processing, so that the electrical signal is converted into an image visible to a naked eye. The ISP can also optimize noise, luminance, and a skin color of the image. The ISP can also optimize parameters such as an exposure and a color temperature in a shooting scenario. In some embodiments, the ISP may be disposed in the camera 193.

The camera 193 is configured to capture still images or videos. For an object, an optical image is generated by using the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP, to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal. In addition to processing a digital image signal, the digital signal processor can also process other digital signals. For example, when the electronic device 100 performs frequency selection, the digital signal processor is configured to perform Fourier transform and the like on frequency energy.

The video codec is configured to compress or decompress a digital video. The electronic device 100 can support one or more video codecs. In this way, the electronic device 100 can play back or record videos in various encoding formats, for example, moving picture experts group (moving picture experts group, MPEG) 1, MPEG2, MPEG3, and MPEG4.

In the embodiments of this application, the process in which the electronic device 100 displays images captured by the camera and generates a video in the user interfaces shown in FIG. 1A and FIG. 1B, FIG. 2A to FIG. 2I, FIG. 3A to FIG. 3F, FIG. 4A to FIG. 4D, and FIG. 5A and FIG. 5B depends on the shooting capabilities provided by the ISP, the camera 193, the video codec, the GPU, the display 194, and the application processor.

The touch sensor 180K is also known as a "touch device". The touch sensor 180K may be disposed in the display 194, so that the touch sensor 180K and the display 194 constitute a touchscreen, also referred to as a "touch control screen". The touch sensor 180K is configured to detect a touch operation performed on or near the touch sensor 180K. The touch sensor may transfer a detected touch operation to the application processor to determine a touch event type. A visual output related to the touch operation may be provided by the display 194. In other embodiments, the touch sensor 180K may alternatively be disposed on a surface of the electronic device 100, or disposed in a position different from the display 194.

In the embodiments of this application, the electronic device 100 can use touch detection provided by the touch sensor 180K to determine whether a user operation performed on a control such as the control 111 or the control 112 in FIG. 1A is detected.

The term "user interface (user interface, UI)" in the specification, claims, and accompanying drawings of this application is a medium interface for interaction and information exchange between an application program or the operating system and the user. The user interface implements conversion between an internal form of information and a form acceptable to the user. The user interface of the application program is source code complied by using a specific computer language such as Java or an extensible markup language (extensible markup language, XML). The source code of the interface is parsed and rendered on a terminal device, and finally presented as content that can be recognized by the user, such as a picture, a text, a button, or other controls. A control (control), also known as a widget (widget), is a basic element of the user interface. Typical controls include a toolbar (toolbar), a menu bar (menu bar), a text box (text box), a button (button), a scrollbar (scrollbar), a picture, and a text. Properties and content of controls in the interface are defined by using tags or nodes. For example, XML uses nodes such as <Textview>, <ImgView>, and <VideoView> to specify the controls included in the interface. A node corresponds to a control or a property in the interface. After being parsed and rendered, the node is presented as content visible to the user. In addition, in many application programs such as hybrid applications (hybrid application), an interface usually further includes a web page. A web page, also known as a page, may be understood as a special control embedded in an application program interface. The web page is source code compiled by using a specific computer language, such as a hypertext markup language (hypertext markup language, GTML), cascading style sheets (cascading style sheets, CSS), or Java script (JavaScript, JS). The source code of the web page can be loaded and displayed as user-recognizable content by a browser or a web display component that is functionally similar to a browser. Specific content included in the web page is also defined by using tags or nodes in the source code of the web page. For example, GTML uses <p>, <img>, <video>, and <canvas> to define elements and properties of a web page.

The user interface is usually represented in a form of a graphical user interface (graphic user interface, GUI), which is a user interface displayed in a graphical mode and related to computer operations. A graphical user interface may be an icon, a window, a control, or other interface elements displayed on the display of the electronic device. The control may include a visual interface element such as an icon, a button, a menu, a tab, a text box, a dialog box, a status bar, a navigation bar, or a widget.

As used in the specification of this application and the appended claims, singular expression forms "one", "a", "the", "the foregoing", and "this" are intended to also include plural expression forms, unless otherwise specified in the context. It should also be understood that the term "and/or" used in this application indicates and includes any or all possible combinations of one or more listed items. As used in the foregoing embodiments, the term "when" may be interpreted as "if", "after", "in response to determining", or "in response to detecting", depending on the context. Similarly, the phrase "when determining" or "if detecting [the described condition or event]" may be interpreted as "if determining", "in response to determining", "when detecting [the described condition or event]", or "in response to detecting [the described condition or event]", depending on the context.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the processes or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or may be a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk), or the like.

A person of ordinary skill in the art may understand that all or some of the processes of the methods in the foregoing embodiments may be implemented by a computer program instructing relevant hardware. The program may be stored in a computer-readable storage medium. When the program is executed, the processes of the methods in the foregoing embodiments may be performed. The storage medium includes any medium that can store program code, such as a ROM, a random access memory RAM, a magnetic disk, or an optical disc.

What is claimed is:

1. A method, comprising:
    displaying, by an electronic device, a first interface, wherein the electronic device comprises a first camera and a second camera, wherein the first interface comprises a first preview window and a second preview window, wherein the first preview window displays an image captured in real time by the first camera, and wherein the second preview window displays an image captured in real time by the second camera;
    detecting, by the electronic device, a first gesture of a user; and
    displaying, by the electronic device, a second interface in response to the first gesture, wherein the second interface comprises a third preview window, and the third preview window displays the image captured in real time by the first camera or the image captured in real time by the second camera, wherein
    the detecting the first gesture of the user comprises:
        capturing a first image, wherein the first image is captured by the first camera or the second camera, the first image comprises a hand image, and the hand image is located at a first position in the first image;
        capturing a second image, wherein the second image is captured by the first camera or the second camera, the second image comprises the hand image, the hand image is located at a second position in the second image, and the second position is different from the first position;
        determining a first displacement vector based on the first position, wherein the first displacement vector comprises first direction information, and the first direction information identifies a first direction of the first displacement vector;
    determining a second displacement vector based on the second position, wherein the second displacement vector comprises second direction information, and the second direction information identifies a second direction of the second displacement vector; and
    determining the first gesture based on the first displacement vector and the second displacement vector.

2. The method according to claim 1, wherein the method further comprises:
    capturing a third image, wherein the third image is captured after the first image is captured and before the second image is captured, the third image comprises the hand image, the hand image is located at a third position in the third image, and the third position is different from both the first position and the second position,
    wherein the determining the first displacement vector based on the first position comprises:
        determining the first displacement vector based on the first position and the third position, and
    wherein the determining the second displacement vector based on the second position comprises:
        determining the second displacement vector based on the second position and the third position.

3. The method according to claim 2, wherein the determining the first gesture based on the first displacement vector and the second displacement vector comprises:
    when the first direction information is the same as the second direction information, determining that the first gesture is a sliding gesture.

4. The method according to claim 3, wherein the method further comprises:
    when the first direction information is different from the second direction information, determining that the first gesture is a waving gesture.

5. The method according to claim 3, wherein
    the first position is of a characteristic point of the hand image on a first coordinate axis of the first image, wherein the first coordinate axis is parallel to the ground,
    the second position is of the characteristic point of the hand image on the first coordinate axis of the second image,
    the third position is of the characteristic point of the hand image on the first coordinate axis of the third image,
    the first direction information is a positive direction or a negative direction of the first coordinate axis, and the second direction information is the positive direction or the negative direction of the first coordinate axis.

6. The method according to claim 5, wherein the positive direction of the first coordinate axis is a horizontal direction from left to right, and after the determining that the first gesture is the sliding gesture, the method further comprises:
when the first direction information is the positive direction of the first coordinate axis, determining that the first gesture is a right-sliding gesture in the sliding gesture; or when the first direction information is the negative direction of the first coordinate axis, determining that the first gesture is a left-sliding gesture in the sliding gesture.

7. The method according to claim 2, wherein a position offset between the first position and the third position is a modulus of the first displacement vector, and a direction from the first position to the third position is the first direction information of the first displacement vector.

8. The method according to claim 2, wherein the determining the first displacement vector based on the first position and the third position comprises:
determining a fourth position by using the first position and the third position, wherein a position offset between the fourth position and the third position is a modulus of the first displacement vector, and a direction from the fourth position to the third position is the first direction information of the first displacement vector.

9. The method according to claim 8, wherein the determining the fourth position by using the first position and the third position comprises:
determining a fifth position corresponding to the first position, calculating a middle position between the fifth position and the third position, and determining that the middle position is the fourth position.

10. An electronic device, comprising:
a first camera;
a second camera;
one or more processors and one or more memories, wherein the one or more memories are coupled to the one or more processors, the one or more memories store computer program code, the computer program code comprises computer instructions, and when executing the computer instructions, the electronic device is enabled to perform operations including:
displaying a first interface, wherein the first interface comprises a first preview window and a second preview window, the first preview window displays an image captured in real time by the first camera, and the second preview window displays an image captured in real time by the second camera;
detecting a first gesture of a user; and
displaying a second interface in response to the first gesture, wherein the second interface comprises a third preview window, and the third preview window displays the image captured in real time by the first camera or the image captured in real time by the second camera, wherein
the detecting the first gesture of the user comprises:
capturing a first image, wherein the first image is captured by the first camera or the second camera, the first image comprises a hand image, and the hand image is located at a first position in the first image;
capturing a second image, wherein the second image is captured by the first camera or the second camera, the second image comprises the hand image, the hand image is located at a second position in the second image, and the second position is different from the first position;
determining a first displacement vector based on the first position, wherein the first displacement vector comprises first direction information, and the first direction information identifies a first direction of the first displacement vector;
determining a second displacement vector based on the second position, wherein the second displacement vector comprises second direction information, and the second direction information identifies a second direction of the second displacement vector; and
determining the first gesture based on the first displacement vector and the second displacement vector.

11. The electronic device according to claim 10, wherein the operations further comprising:
capturing a third image, wherein the third image is captured after the first image is captured and before the second image is captured, the third image comprises the hand image, the hand image is located at a third position in the third image, and the third position is different from both the first position and the second position,
wherein the determining the first displacement vector based on the first position comprises:
determining the first displacement vector based on the first position and the third position, and
wherein the determining the second displacement vector based on the second position comprises:
determining the second displacement vector based on the second position and the third position.

12. The electronic device according to claim 11, wherein the determining the first gesture based on the first displacement vector and the second displacement vector comprises:
when the first direction information is the same as the second direction information, determining that the first gesture is a sliding gesture.

13. The electronic device according to claim 12, the operations further comprising:
when the first direction information is different from the second direction information, determining that the first gesture is a waving gesture.

14. The electronic device according to claim 12, wherein the first position is of a characteristic point of the hand image on a first coordinate axis of the first image, wherein the first coordinate axis is parallel to the ground,
the second position is of the characteristic point of the hand image on the first coordinate axis of the second image,
the third position is of the characteristic point of the hand image on the first coordinate axis of the third image,
the first direction information is a positive direction or a negative direction of the first coordinate axis, and
the second direction information is the positive direction or the negative direction of the first coordinate axis.

15. The electronic device according to claim 14, wherein the positive direction of the first coordinate axis is a horizontal direction from left to right, and after the determining that the first gesture is the sliding gesture, the operations further comprise:
when the first direction information is the positive direction of the first coordinate axis, determining that the first gesture is a right-sliding gesture in the sliding gesture; or when the first direction information is the negative direction of the first coordinate axis, determining that the first gesture is a left-sliding gesture in the sliding gesture.

16. The electronic device according to claim 11, wherein a position offset between the first position and the third position is a modulus of the first displacement vector, and a direction from the first position to the third position is the first direction information of the first displacement vector.

17. The electronic device according to claim 11, wherein the determining the first displacement vector based on the first position and the third position comprises:
   determining a fourth position by using the first position and the third position, wherein a position offset between the fourth position and the third position is a modulus of the first displacement vector, and a direction from the fourth position to the third position is the first direction information of the first displacement vector.

18. The electronic device according to claim 17, wherein the determining the fourth position by using the first position and the third position comprises:
   determining a fifth position corresponding to the first position, calculating a middle position between the fifth position and the third position, and determining that the middle position is the fourth position.

19. The electronic device according to claim 10, wherein the first camera is a front camera, and the second camera is a back camera, or
   the first camera is a first front camera, and the second camera is a second front camera, or
   the first camera is a first back camera, and the second camera is a second back camera.

20. A non-transitory computer-readable storage medium storing instructions, wherein when an electronic device runs the instructions, the electronic device is enabled to perform operations:
   displaying a first interface, wherein the first interface comprises a first preview window and a second preview window, the first preview window displays an image captured in real time by a first camera, and the second preview window displays an image captured in real time by a second camera;
   detecting a first gesture of a user; and
   displaying a second interface in response to the first gesture, wherein the second interface comprises a third preview window, and the third preview window displays the image captured in real time by the first camera or the image captured in real time by the second camera, wherein
   the detecting the first gesture of the user comprises:
      capturing a first image, wherein the first image is captured by the first camera or the second camera, the first image comprises a hand image, and the hand image is located at a first position in the first image;
      capturing a second image, wherein the second image is captured by the first camera or the second camera, the second image comprises the hand image, the hand image is located at a second position in the second image, and the second position is different from the first position;
      determining a first displacement vector based on the first position, wherein the first displacement vector comprises first direction information, and the first direction information identifies a first direction of the first displacement vector;
      determining a second displacement vector based on the second position, wherein the second displacement vector comprises second direction information, and the second direction information identifies a second direction of the second displacement vector; and
      determining the first gesture based on the first displacement vector and the second displacement vector.

* * * * *